United States Patent
Richards et al.

(10) Patent No.: US 6,954,480 B2
(45) Date of Patent: Oct. 11, 2005

(54) METHOD AND APPARATUS FOR IMPROVING RECEIVED SIGNAL QUALITY IN AN IMPULSE RADIO SYSTEM

(75) Inventors: James L. Richards, Fayetteville, TN (US); Mark D. Roberts, Huntsville, AL (US)

(73) Assignee: Time Domain Corporation, Huntsville, AL (US)

(*) Notice: Subject to any disclaimer, the term of this patent is extended or adjusted under 35 U.S.C. 154(b) by 803 days.

(21) Appl. No.: 09/879,226

(22) Filed: Jun. 13, 2001

(65) Prior Publication Data

US 2002/0196845 A1 Dec. 26, 2002

(51) Int. Cl.[7] .............................................. H04L 27/30
(52) U.S. Cl. ...................... 375/130; 375/239; 375/240; 375/256
(58) Field of Search .............................. 375/130, 138, 375/239, 240, 242, 256, 284–286, 346, 355; 342/21, 25, 57, 60, 82, 88, 137

(56) References Cited

U.S. PATENT DOCUMENTS

| | | |
|---|---|---|
| 4,472,814 A | 9/1984 | Gutleber |
| 4,641,317 A | 2/1987 | Fullerton |
| 4,813,057 A | 3/1989 | Fullerton |
| 4,901,307 A | 2/1990 | Gilhousen et al. |
| 4,979,186 A | 12/1990 | Fullerton |
| 5,363,057 A | 11/1994 | Furuno |
| 5,363,108 A | 11/1994 | Fullerton |
| 5,610,907 A | 3/1997 | Barrett |
| 5,623,511 A | 4/1997 | Bar-David et al. |
| 5,677,927 A | 10/1997 | Fullerton et al. |
| 5,687,169 A | 11/1997 | Fullerton |
| 5,764,696 A | 6/1998 | Barnes et al. |
| 5,832,035 A | 11/1998 | Fullerton |
| 5,847,677 A | 12/1998 | McCorkle |
| 5,920,278 A * | 7/1999 | Tyler et al. .................. 342/33 |
| 5,963,581 A | 10/1999 | Fullerton et al. |
| 6,072,420 A | 6/2000 | Hellsten |
| 6,111,536 A | 8/2000 | Richards et al. |
| 6,133,876 A | 10/2000 | Fullerton et al. |
| 6,456,231 B1 * | 9/2002 | McEwan ..................... 342/93 |

FOREIGN PATENT DOCUMENTS

WO      WO01/33714      5/2001

* cited by examiner

*Primary Examiner*—Dac V. Ha
(74) *Attorney, Agent, or Firm*—Venable LLP; Robert Babayi

(57) ABSTRACT

An impulse radio system includes an impulse transmitter that transmits a pulse train comprising a number of pulses that are positioned in time for conveying an information signal. An impulse receiver receives the pulse train in accordance with specified arrival times of each pulse and measures interference samples at interference sample times that do not coincide with the pulse arrival times. The interference sample times are varied and the received pulse train signal is modified until a received signal quality criterion is satisfied. The interference sample times may be specified by a code that may also specify pulse arrival times.

37 Claims, 18 Drawing Sheets

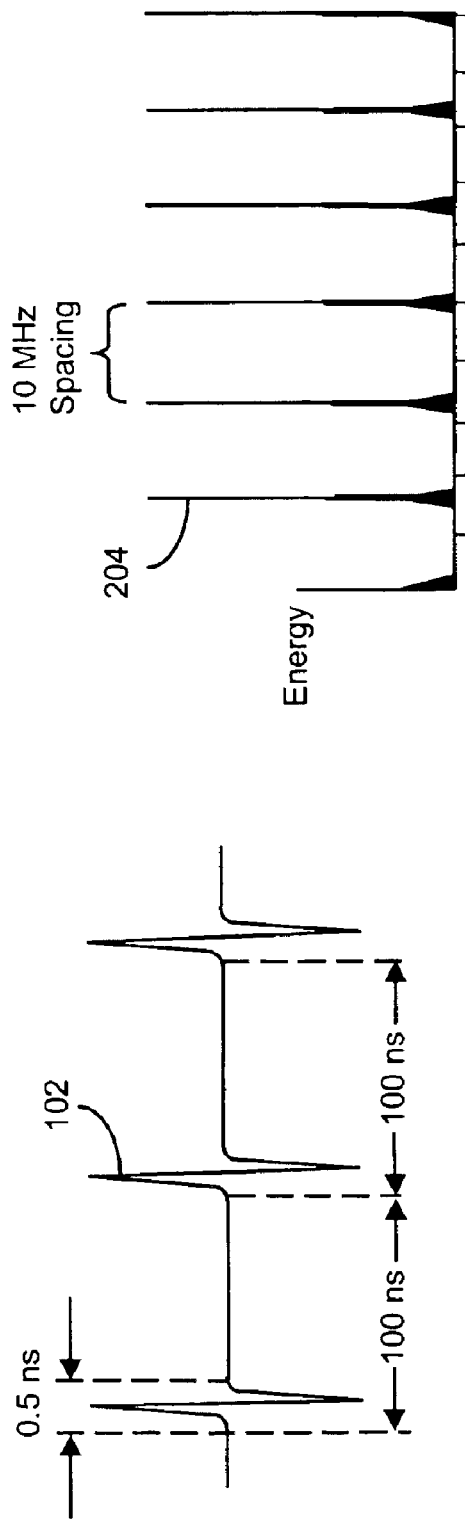
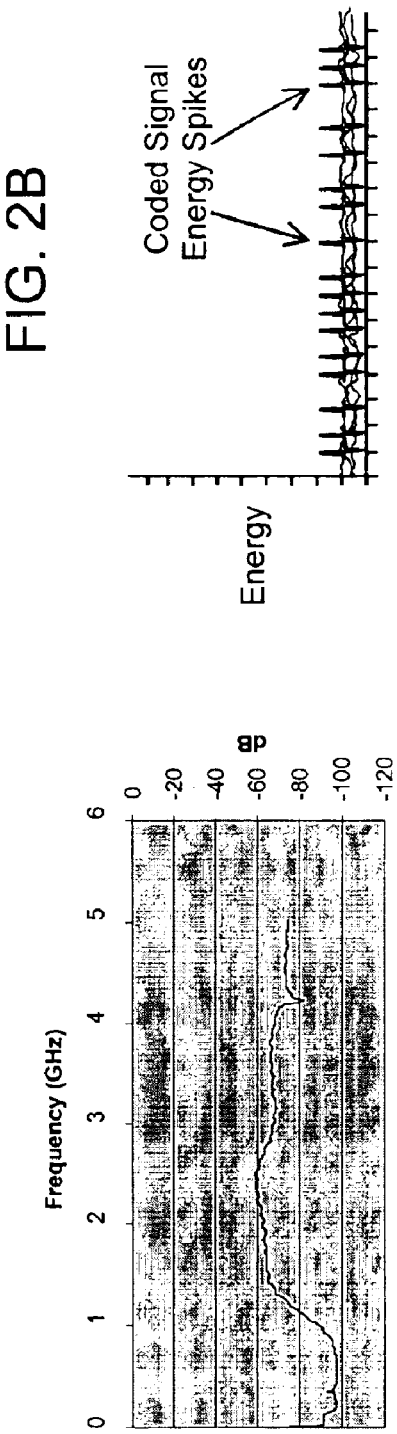
FIG. 2B
FIG. 2D
FIG. 2A
FIG. 2C

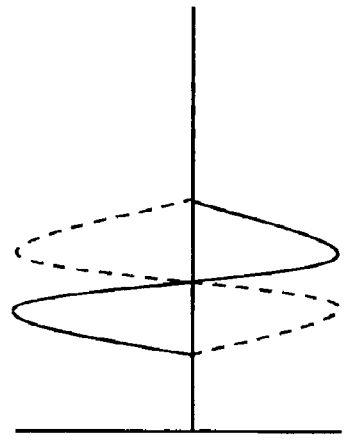
FIG. 4C Flip Modulation
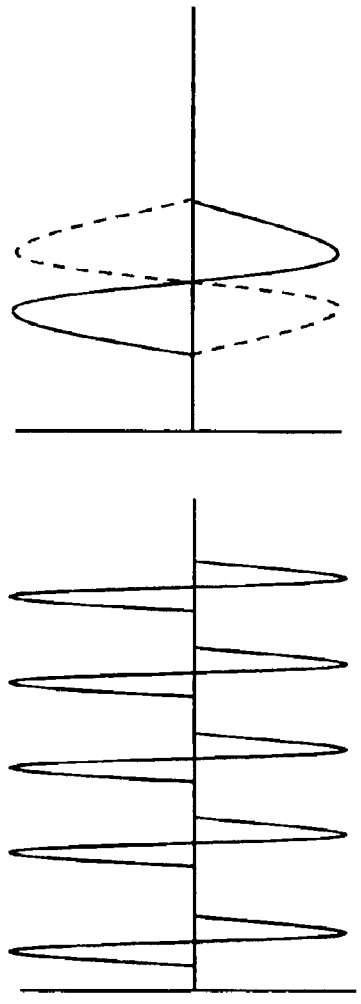
FIG. 4B One of Many Modulation
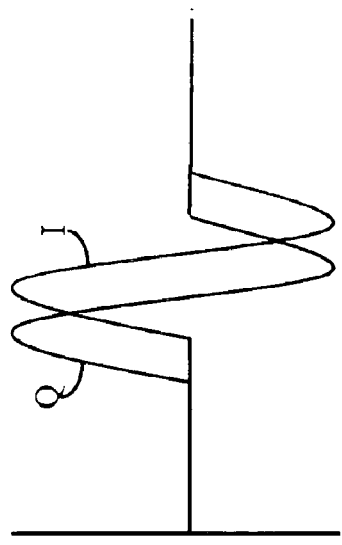
FIG. 4A Early – Late Modulation
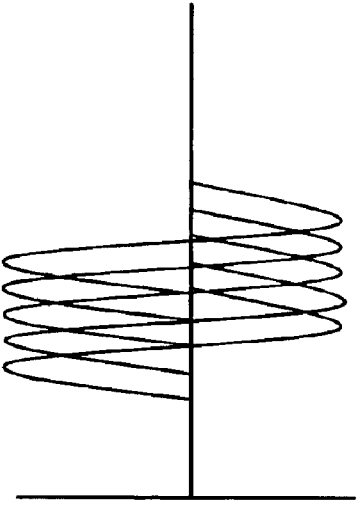
FIG. 4E Vector Modulation
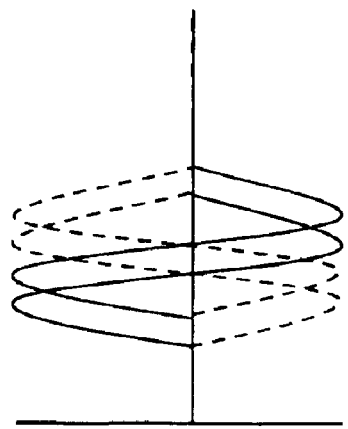
FIG. 4D Quad Flip Modulation

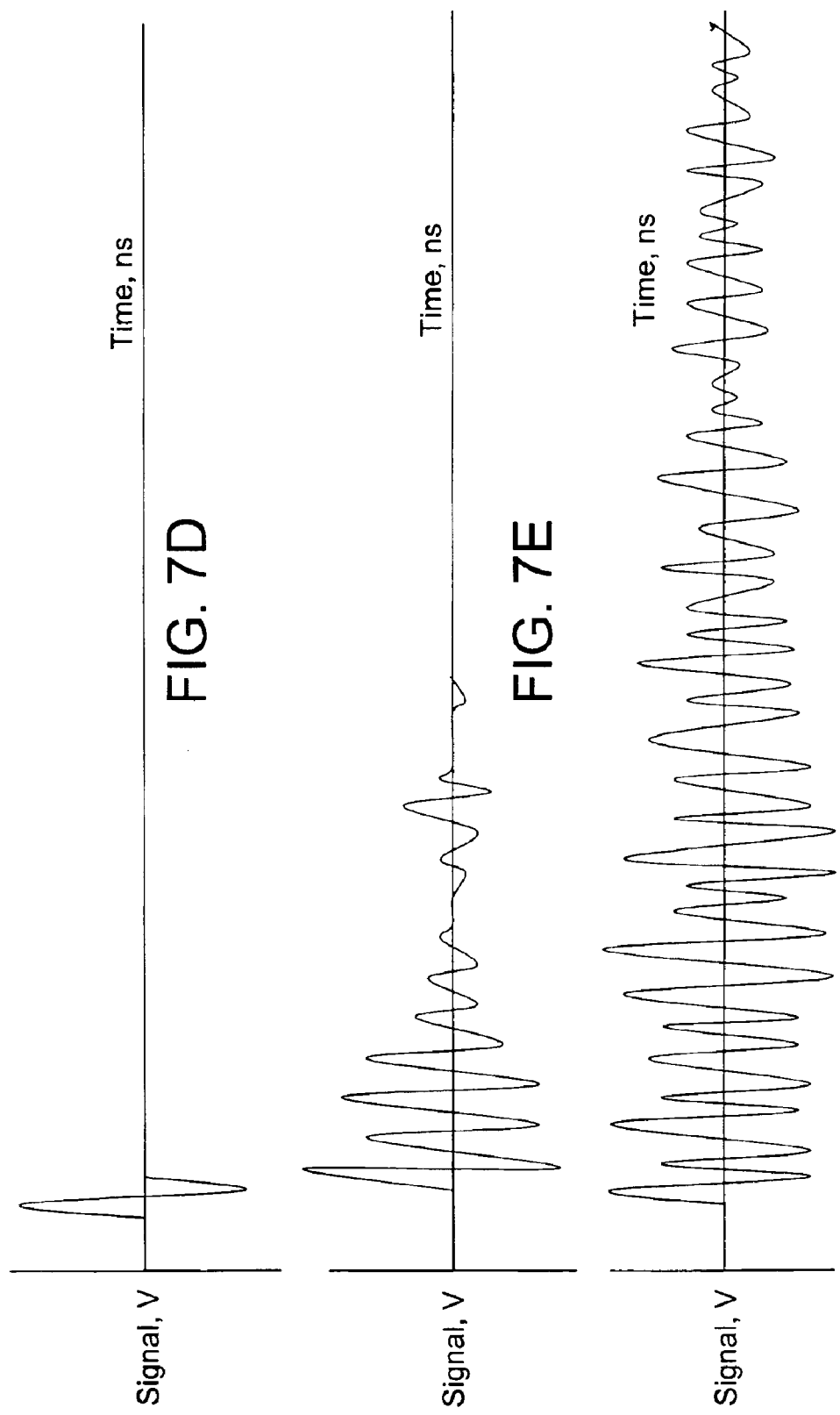

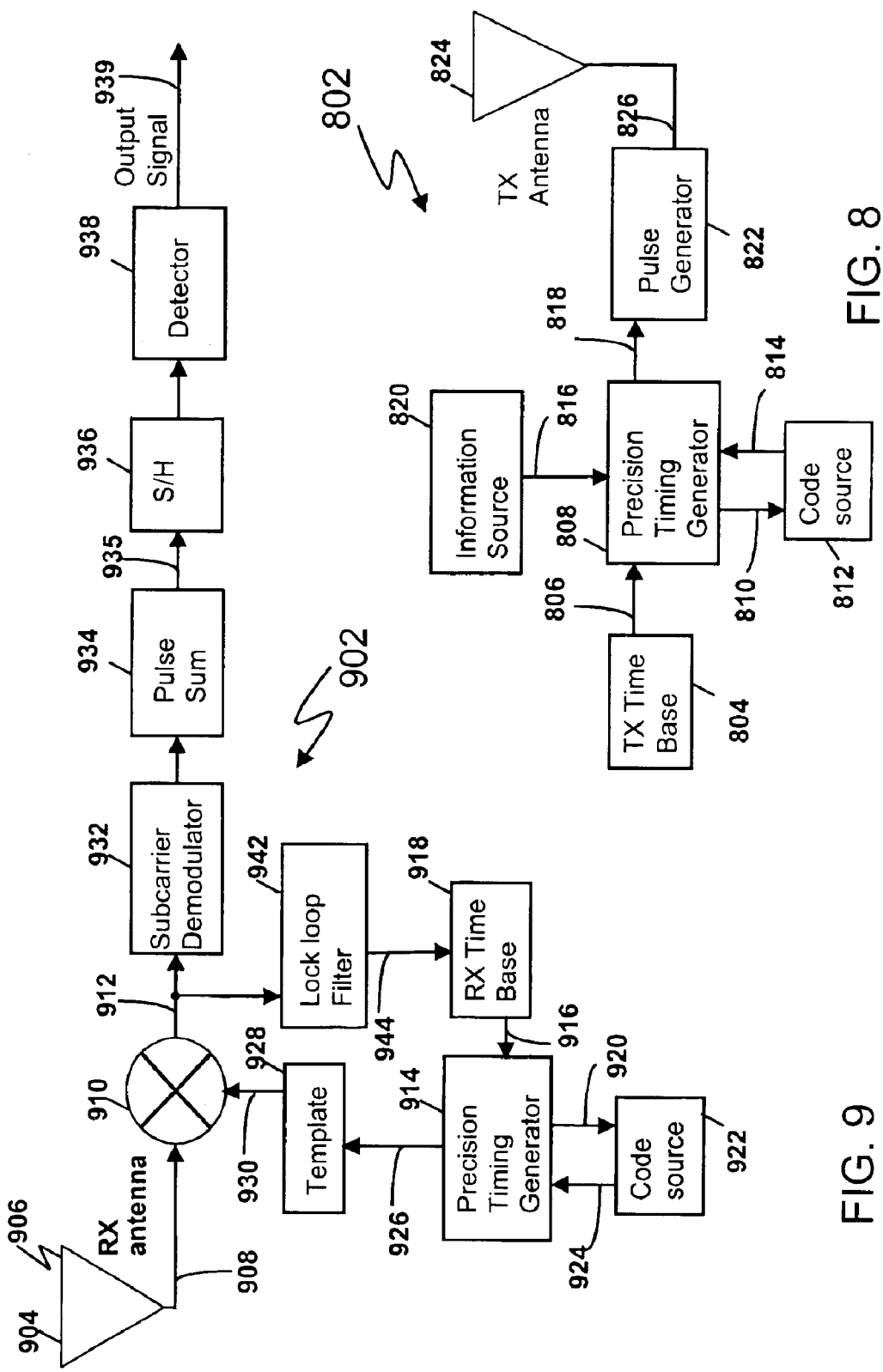

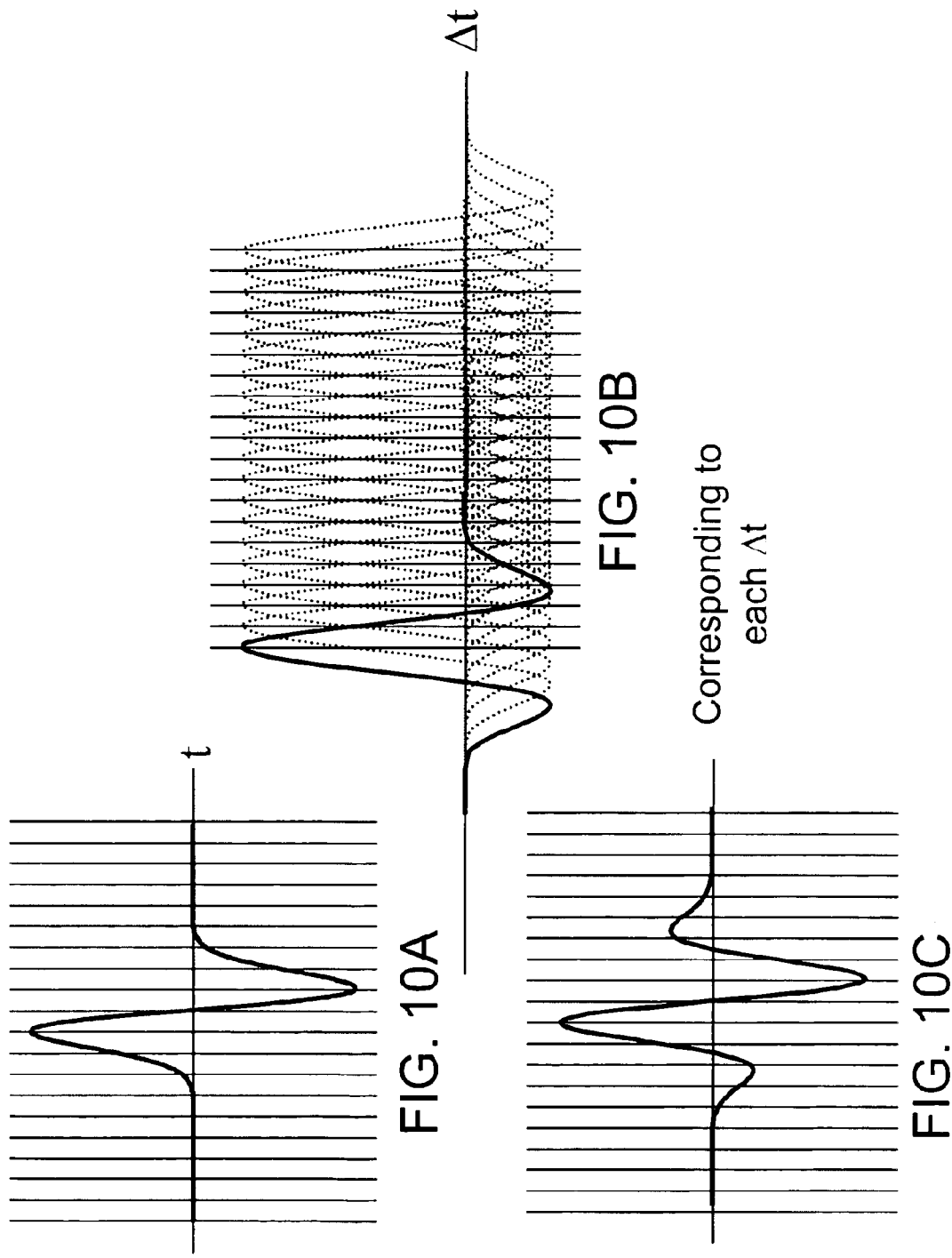

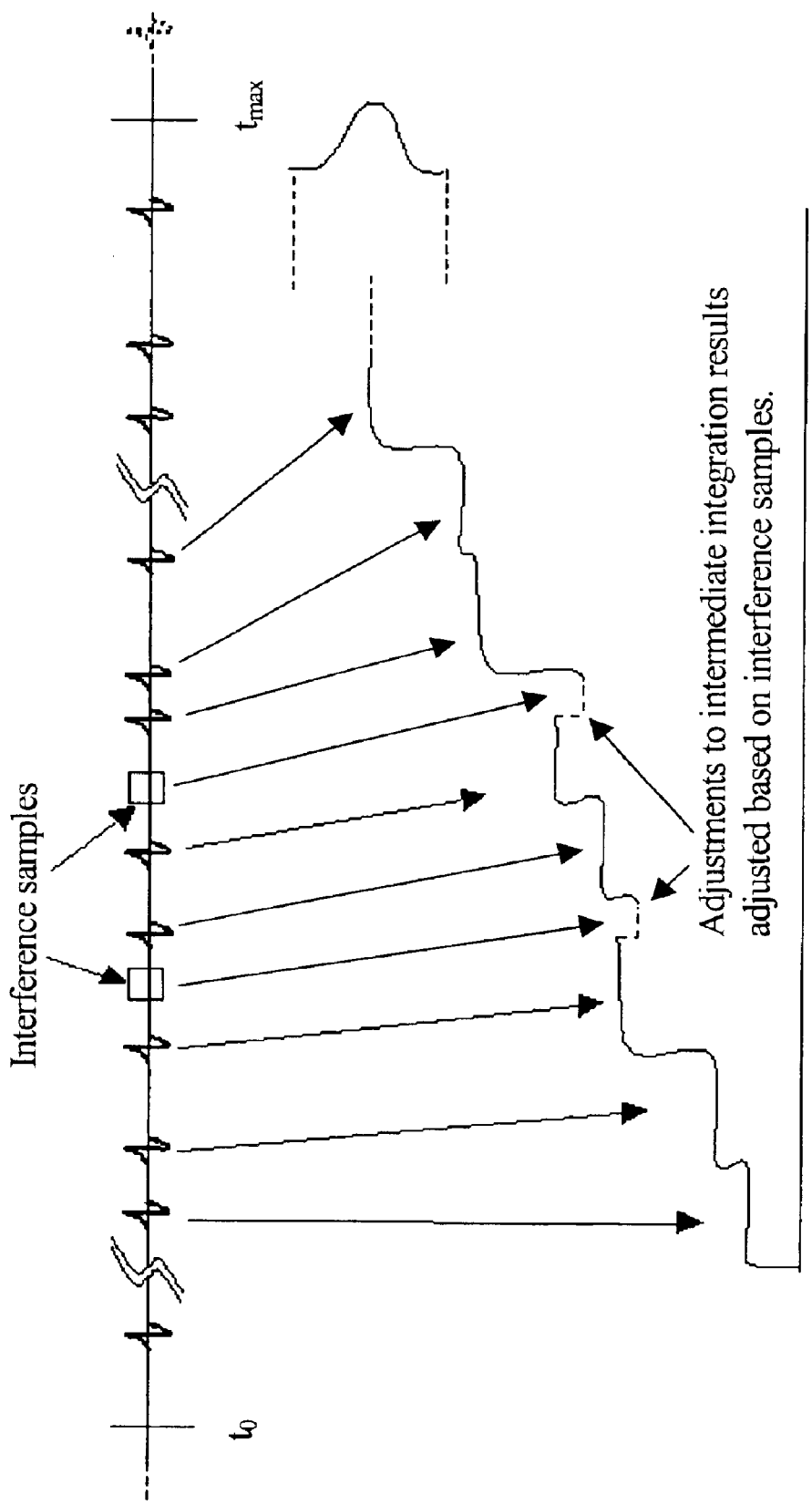

METHOD AND APPARATUS FOR IMPROVING RECEIVED SIGNAL QUALITY IN AN IMPULSE RADIO SYSTEM

CROSS-REFERENCE TO RELATED APPLICATIONS

The following applications of common assignee may contain common disclosure with the present application:

U.S. patent application Ser. No. 09/638,192 entitled "A METHOD FOR SPECIFYING NON-TEMPORAL PULSE CHARACTERISTICS", filed on Aug. 15, 2000.

U.S. patent application Ser. No. 09/638,046 entitled "A METHOD AND APPARATUS FOR APPLYING CODES HAVE PREDEFINED PROPERTIES", filed on Aug. 15, 2000.

U.S. patent application Ser. No. 09/637,878 entitled "A METHOD AND APPARATUS FOR POSITIONING PULSES USING A LAYOUT HAVING NON-ALLOWABLE REGIONS", filed on Aug. 15, 2000.

U.S. patent application Ser. No. 09/638,150 entitled "A METHOD AND APPARATUS FOR POSITIONING PULSES IN TIME", filed on Aug. 15, 2000.

U.S. patent application Ser. No. 09/638,151 entitled "A METHOD AND APPARATUS FOR MAPPING PULSES TO A NON-FIXED LAYOUT", file on Aug. 15, 2000.

U.S. patent application Ser. No. 09/638,152 entitled "A METHOD AND APPARATUS FOR SPECIFYING PULSE CHARACTERISTICS USING CODE THAT SATISFIES PREDEFINED CRITERIA", filed on Aug. 15, 2000.

U.S. patent application Ser. No. 09/638,153 entitled "A METHOD FOR SPECIFYING PULSE CHARACTERISTICS USING CODES", filed on Aug. 15, 2000.

U.S. patent application Ser. No. 09/638,154 entitled "A METHOD FOR SPECIFYING NON-ALLOWABLE PULSE CHARACTERISTICS", filed on Aug. 15, 2000.

U.S. patent application Ser. No. 09/708,025 entitled "A METHOD AND APPARATUS FOR GENERATING A PULSE TRAIN WITH SPECIFIABLE SPECTRAL RESPONSE CHARACTERISTICS", filed on Nov. 8, 2000.

The above-listed applications are incorporated herein by reference in their entireties.

TECHNICAL FIELD

The present invention relates to impulse transmission systems and, more particularly, to a method and apparatus for improving received signals quality in an impulse radio system.

BACKGROUND OF THE INVENTION

As the availability of communication bandwidth in the increasingly crowded frequency spectrum is becoming a scarce and valuable commodity, Ultra Wideband (UWB) technology provides an excellent alternative for offering significant communication bandwidth, particularly, for various wireless communications applications. Because UWB communication systems are based on communicating extremely short-duration pulses (e.g., pico-seconds in duration), such systems are also known as impulse radio systems. Impulse radio systems are described in a series of patents, including U.S. Pat. No. 4,641,317 (issued Feb. 3, 1987), U.S. Pat No. 4,813,057 (issued Mar. 14, 1989), U.S. Pat. No. 4,979,186 (issued Dec. 18, 1990), and U.S. Pat. No. 5,363,057 (issued Nov. 8, 1994) to Larry W. Fullerton, and U.S. Pat. No. 5,677,927 (issued Oct. 14, 1997), U.S. Pat. No. 5,687,169 (issued Nov. 11, 1997), and U.S. Pat. No. 5,832,035 (issued Nov. 3, 1998) to Larry W. Fullerton, et al. These patents are incorporated herein by reference.

Multiple access impulse radio systems are radically different from conventional Code Division Multiple Access (CDMA), Time Division Multiple Access (TDMA) and Frequency Division Multiple Access (FDMA) systems. Unlike such systems, which use continuous sinusoidal waveforms for transmitting information, a conventional impulse radio transmitter emits a low power electromagnetic train of short pulses, which are shaped to approach a Gaussian monocycle. As a result, the impulse radio transmitter uses very little power to generate noise-like communication signals for use in multiple-access communications, radar and positioning applications, among other things. In the multi-access communication applications, the impulse radio systems depend, in part, on processing gain to achieve rejection of unwanted signals. Because of the extremely high achievable processing gains, the impulse radio systems are relatively immune to unwanted signals and interference, which limit the performance of systems that use continuous sinusoidal waveforms. The high processing gains of the impulse radio systems also provide much higher dynamic ranges than those commonly achieved by the processing gains of other known spread-spectrum systems.

Impulse radio communication systems transmit and receive the pulses at precisely controlled time intervals, in accordance with a time-hopping code. As such, the time-hopping code defines a communication channel that can be considered as a unidirectional data path for communicating information at high speed. In order to communicate the information over such channels, impulse radio transmitters may use position modulation, which is a form of time modulation, to position the pulses in time, based on instantaneous samples of a modulating information signal. The modulating information signal may for example be a multi-state information signal, such as a binary signal. Under this arrangement, a modulator varies relative positions of a plurality of pulses on a pulse-by-pulse basis, in accordance with the modulating information signal and a specific time-hopping code that defines the communication channel.

In applications where the modulating information signal is a binary information signal, each binary state may modulate the time position of more than one pulse to generate a modulated, coded timing signal that comprises a train of identically shaped pulses that represent a single data bit. The impulse transmitter applies the generated pulses to a specified transmission medium, via a coupler, such as an antenna, which electromagnetically radiates the pulses for reception by an impulse radio receiver. The impulse radio receiver typically includes a single direct conversion stage. Using a correlator, the conversion stage coherently converts the received pulses to a baseband signal, based on a priori knowledge of the time-hopping code. Because of the correlation properties of the selected time-hopping codes, the correlator integrates the desired received pulses coherently, while the undesired noise signals are integrated non-coherently such that by comparing the coherent and non-coherent integration results, the impulse receiver can recover the communicated information.

Conventional spread-spectrum code division multiple access (SS-CDMA) techniques accommodate multiple users by permitting them to use the same frequency bandwidth at the same time. Direct sequence CDMA systems employ pseudo-noise (PN) codewords generated at a transmitter to "spread" the bandwidth occupied by transmitted data beyond the minimum required by the data. The conventional SS-CDMA systems employ a family of orthogonal or quasi-orthogonal spreading codes, with a pilot spreading code sequence synchronized to the family of codes. Each user is assigned one of the spreading codes as a spreading function. One such spread-spectrum system is described in U.S. Pat. No. 4,901,307 entitled "SPREAD-SPECTRUM MULTIPLE ACCESS COMMUNICATION SYSTEM USING SATELLITE OR TERRESTRIAL REPEATERS" by Gilhousen et al.

Unlike direct sequence spread-spectrum systems, impulse radio communications systems have not employed time-hopping codes for energy spreading, because the monocycle pulses themselves have an inherently wide bandwidth. Instead, the impulse radio systems use the time-hoping codes for channelization, energy smoothing in the frequency domain, and interference suppression. The time-hoping code defines a relative position of each pulse within a group of pulses, or pulse train, such that the combination of pulse positions defines the communications channel. In order to convey information on such communication channel, each state of a multi-state information signal may vary a relative pulse position by a predefined time shift such that a modulated, coded timing signal is generated comprising a train of pulses, each with timing corresponding to the combination of the time position coding and the multi-state modulation. Alternative modulation schemes may also be used instead of time modulation or in combination with it.

In one conventional binary approach, pulses are time-modulated forward or backward about a nominal position. More specifically, each pulse is time modulated by adjusting its position within a time frame to one of two or more possible times. For example, in order to send a "0" binary bit during the time frame, the pulse may be offset from a nominal position of the time frame by about −50 picoseconds. For a "1" binary state, the pulse may be offset from the nominal position by about +50 picoseconds. Conventional coders that generate the time-hoping code do so in response to a periodic timing signal that corresponds to the data-rate of the multi-state information signal. The data rate of the impulse radio transmission may for example be a fraction of a periodic timing signal that is used as a time base or time reference.

Generally speaking, an impulse radio receiver is a direct conversion receiver with a cross correlator front end. The front end coherently converts an electromagnetic pulse train of monocycle pulses to a baseband signal in a single stage. Because each data bit modulates the time position of many pulses of the periodic timing signal, a modulated, coded timing signal is produced comprising a train of identically shaped pulses for each single data bit. The impulse radio receiver integrates multiple pulses to recover the transmitted information.

In practice, decoding errors are minimized using distinctive time-hopping codes with suitable autocorrelation and cross-correlation properties. The cross-correlation between any two time-hopping codes should be low for minimal interference between multiple users in a communications system or between multiple target reflections in radar and positioning applications. At the same time, the autocorrelation property of a time-hoping code should be steeply peaked, with small side-lobes. Maximally peaked time-hopping code autocorrelation yields optimal acquisition and synchronization properties for communications, radar and positioning applications.

Various coding schemes with known correlation characteristics are available. For example, algebraic codes, Quadratic Congruential (QC) codes, Hyperbolic Congruential (HC) codes and optical codes have been suggested in the past for coding in impulse radio systems. Generally, based on known assumptions, the coding schemes guarantee a maximum number of pulse coincidences, i.e., hits, for any defined time frame or time frame shift during which the codes are repeated. For example, HC codes are guaranteed a maximum of two hits for any subframe or frame shift.

McCorkle in U.S. Pat. No. 5,847,677 discloses a random number generator for generating a pseudorandom code for use with jittered pulse repetition interval radar systems. The code is generated by a random number generator that possesses certain attributes desirable for jittered radar. As disclosed, the attributes related to a flat frequency spectrum, a nearly perfect spike for an autocorrelation function, a controllable absolute minimum and maximum interval, long sequences that do not repeat, and a reasonable average pulse rate.

One known coding technique for an impulse radio is disclosed by Barrett in U.S. Pat. No. 5,610,907, entitled "Ultrafast Time Hopping CDMA-RF Communications: Code-As-Carrier, Multichannel Operation, High data Rate Operation and Data Rate on Demand." According to the disclosed techniques, two levels of coding are used: major orthogonal codes are applied to provide multiple channels, and forward error correction (FEC) codes are applied to information data before transmission. The disclosed system relies on dividing time into repetitive super-frames, frames and subframes. As disclosed, a super-frame corresponds to a time interval of about 1 millisecond, representing one repetition of a code pattern, where as a frame is defined as a time interval of about 1 microsecond divided according to a code length. A subframe corresponds to a short time interval of about 1 nanosecond during which a pulse is time positioned.

It is well known that communicated signals over a wireless transmission medium can be subject to various types of interference. In communicating voice messages, data messages, control messages, or other types of messages, interference causes problems by corrupting information intended to be conveyed by the transmission message. As a result, noise, or electromagnetic interference can interfere with efficient communication using impulse radio technology.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods. In some multi-user environments where there is a high density of users in a coverage area or where data rates are so high that processing gain is marginal, power control may be used to reduce the multi-user background noise to improve the number of channels available and the aggregate traffic density of the area. Briefly stated, power control generally refers to adjusting the transmitter output power to the minimum necessary power to achieve acceptable signal reception at an impulse radio receiver.

Another known method for mitigating adverse effects of interference in impulse radio communication varies transmission rates (bit rates), signal strength, packet sizes and frequency of packet repetition, and other parameters associated with conveying a transmission message, whatever the source of the interference may be. Some noise, or interference, may be periodic in nature, with a constant period or with a period that varies over time (i.e., quasi-periodic). Such periodic or quasi-periodic noise may be substantially predicted, at least within a limited time period. Other electromagnetic interference may be intermittent and less predictable. Usually no one type of interference occurs alone; most likely an impulse radio communication system will encounter a variety of interference, having varying periodicity or unpredictability, varying strengths, and other varying parameters.

In a disclosure entitled, "A Method and Apparatus for Canceling Interference in an Impulse system," U.S. patent application Ser. No. 09/689,702, filed Oct. 13, 2000 and assigned to the assignee of the present invention, Richards et al. describe sampling of interference having known or predicted frequency before an expected time of arrival of an impulse in an impulse signal, to produce an interference nulling sample. Then when the impulse arrives, the impulse is sampled in the presence of the interference to produce a data sample. The anticipatory nulling sample is an estimate of interference energy captured in subsequent data sample so that the nulling sample can be used to cancel the interference energy from the data sample. Preferably, the nulling sample precedes the data sample by an odd or even number of half cycle periods of the interference. The nulling sample is additively or subtractively combined with the data sample to derive a corrected data sample, from which a portion of the interference energy, which has known frequency characteristics, is cancelled.

However, because TM-UWB technology is applicable to a wide variety of applications including communications, radar, and positioning, transmitted pulse trains may be subject to interference with unknown frequency characteristics. In some cases, the interfering signals can have a relatively wideband frequency characteristic, such as random or broadband noise. In other cases, the interfering signals can have a relatively narrow band frequency characteristic, such as continuous wave (CW) signals, or modulated signals. As a result, there exists a need for improving received signal quality of the pulse trains in the presence of interference samples that have unknown interfering frequency characteristics.

SUMMARY OF THE INVENTION

Briefly, the present invention relates to communicating pulses having at least one predefined pulse characteristic where a predefined pulse characteristic specifies a position in time in accordance with a time layout. A predefined pulse characteristic may be pulse amplitude, pulse width, pulse polarity, or pulse type. The pulse communication involves transmitting a pulse train signal comprising pulses having defined arrival times at a receiver. The receiver recovers a received pulse train signal in accordance with the arrival times of the pulses. One or more interference samples are measured at interference sample times that do not coincide with pulse arrival times. As such, the interference sample times can be relative to an arrival time. Then, the received pulse train signal is modified by adjusting it relative to the measured interference samples. According to one aspect of the present invention, the receiver varies the interference sample times, measures interference samples, and modifies the received pulse train signal. The interference sample times are varied, interference samples are measured, and the received pulse train is modified, repeatedly, until one or more received signal quality measures satisfy a predefined signal quality criterion.

According to some of the more detailed features of the present invention, an interference sample time may correspond to a discrete time position or a sample time duration over which the interference sample is measured. In one exemplary embodiment, one or more sample time durations are modified until the predefined received signal quality criterion is satisfied. Also, interference sample times can be shifted randomly or in accordance with a sample time shift increment, which may be a variable increment, to satisfy the predefined signal quality criterion. For satisfying the predefined received signal quality criterion, the interference sample times can be varied using such methods as a Newton-Raphson method, steepest descent method, secant method, conjugate gradients method, first derivative test method, and second derivative test method.

According to other more detailed features of the present invention, the pulse train signal can be recovered by correlating a plurality of pulses with a template signal, which can have a variable shape. A number of correlated pulses are integrated to produce a ramp signal that corresponds to a recovered information signal. Under this arrangement, modifying the received pulse train signal requires adjusting the ramp signal based on the interference samples measured at the interference sample times. In a further embodiment, the received pulse train signal is also modified relative to a weighting factor or a weighting factor curve.

In accordance with yet other more detailed features of the present invention, a received signal quality measure, such as received signal strength, signal-to-noise ratio, or bit-error-rate, can be determined, for example, periodically. The received signal quality measure can relate to the received pulse train signal itself or to the received pulse train signal combined with at least one interference sample. Also, the received signal quality measure can correspond to an individual pulse or a plurality of pulses, such as all of the pulses of the received pulse train signal or a subset of the pulses.

In accordance with another aspect of the invention, the pulses are positioned in time in accordance with code elements of a first code and interference is sampled in accordance with code elements of a second code. Under this aspect, the method of the invention changes the code elements of the second code (i.e., the interference sample times) until the predefined received signal criterion is satisfied. With this aspect, the first code can be produced using a code generation technique as described below. The second code can also be produced using a code generation technique as described below or by determining interference sample times relative to pulse positions specified by the first code. In either case, when producing the second code, an interference sample time cannot coincide with a pulse position in time.

In accordance with another aspect of the invention, the pulses are positioned in time in accordance with code elements of a first code. The pulse train signal is received in accordance with code elements of a second code. As such, this aspect of the present invention uses two different codes for communicating pulses. The first code is used for transmission and the second code is used for reception. Under this aspect of the invention, the code elements of the second code may comprise the code elements of the first code, i.e., the code elements that specify the pulse arrival times, as well as additional code elements that are used in the receiver to serve any purpose. For example, while the code elements of the second code that are the same as the code elements of the first code specify pulse arrival times at the receiver, the additional code elements of the second code can specify the interference sample times. Under this aspect, the method of the invention changes the additional code elements (i.e., the interference sample times) until the predefined received signal quality criterion is satisfied. With this aspect, the first code can be produced using a code generation technique as described below. The second code can be produced by combining the code elements of the first code with additional code elements that specify interference sample times different than the pulse positions specified by code elements of the first code.

According to another aspect of the invention, the pulses are positioned in time in accordance with code elements of a first code. A subset of the pulse train signal is received in accordance with code elements of a second code that comprises a subset of the code elements of the first code. For example, a receiver employing the second code may receive a subset of the pulses transmitted in accordance with the first code.

BRIEF DESCRIPTION OF THE DRAWINGS

FIG. 2A illustrates a pulse train in the time domain;

FIG. 2B illustrates a frequency domain amplitude of the pulse train of FIG. 2A;

FIG. 2C illustrates a full spectrum of the pulse train of FIG. 2A;

FIG. 2D illustrates application of a PN code to distribute energy of the pulses;

FIGS. 4A–4E illustrate different modulation techniques applied to a pulse;

FIGS. 7D–7F represent the received signal from a TM-UWB transmitter in three different multipath environments;

FIG. 8 illustrates an exemplary embodiment of an impulse radio transmitter of an impulse radio communication system;

FIG. 9 illustrates an exemplary embodiment of an impulse radio receiver for the impulse radio communication system;

FIG. 10A illustrates a waveform of a template signal;

FIG. 10B illustrates the waveform of a received impulse radio signal at a set of several possible time offsets;

FIG. 10C represents the output of the cross correlator for each of the time offsets of FIG. 10B;

FIG. 11a illustrates a pulse train diagram and adjustment of a ramp signal in accordance with one embodiment of the present invention;

DETAILED DESCRIPTION

I. Overview of the Invention

The First Aspect

Figure 1A:
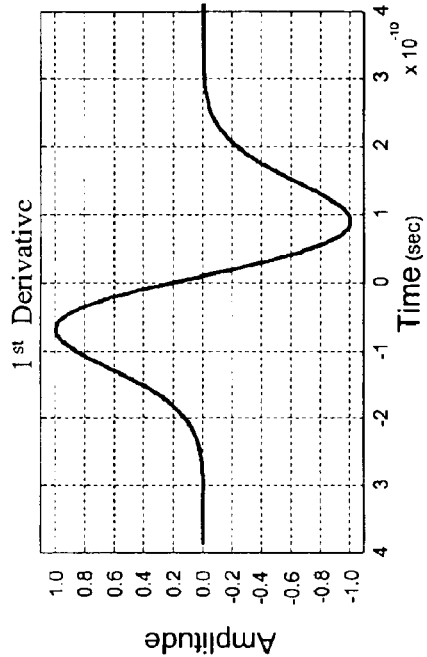
FIG. 1A illustrates a representative Gaussian pulse in the time domain.
Figure 1B:
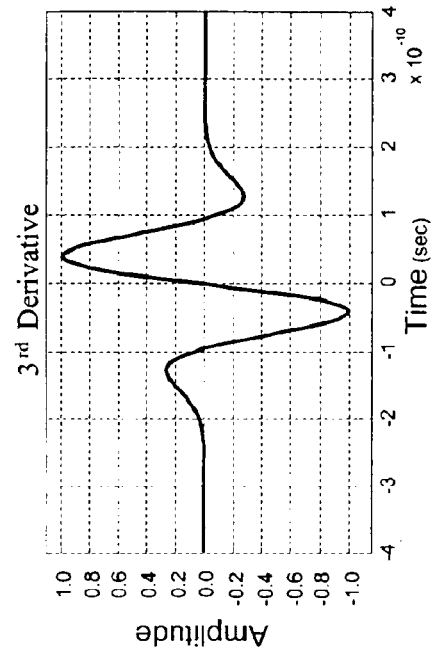
FIG. 1B illustrates a representative Gaussian pulse doublet in the time domain.
Figure 1C:
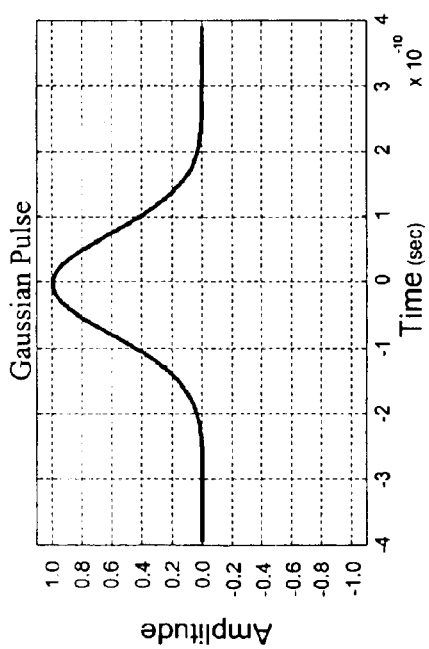
FIG. 1C illustrates a representative Gaussian pulse triplet in the time domain.
Figure 1D:
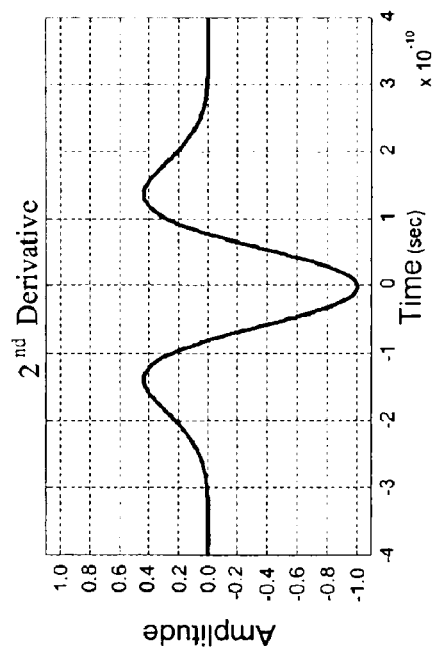
FIG. 1D illustrates a representative Gaussian pulse quadlet in the time domain.

An impulse radio system according to one aspect of the present invention includes an impulse transmitter that transmits a pulse train for conveying an information signal. The pulse train signal comprises pulses having predefined pulse characteristics where a predefined characteristic corresponds to the arrival times of the pulses at an impulse receiver. The impulse receiver recovers the pulse train signal in accordance with the arrival times by correlating the received pulses with a template signal. The receiver also measures interference samples at interference sample times that do not coincide with the arrival times of the pulses. Interference sample times may precede, succeed, or be intermixed with pulse arrival times.

In accordance with this aspect of the present invention, one or more received signal quality measures are determined. The received pulse train signal is modified in accordance with interference samples measured at interference sample times, where the interference samples may be weighted using weighting factors or a weighting factor curve. One or more interference sample times are varied until the one or more received signal quality measures satisfy a predefined signal quality criterion.

Second Aspect

In accordance with a second aspect of the invention, pulses are positioned in time in accordance with code elements of a first code and times for measuring interference signals are specified by a second code. Under this arrangement, the pulse train signal is transmitted and received in accordance with code elements of the first code and interfering signals are measured in accordance with code elements of the second code. With this approach, the predefined criterion may be satisfied by changing the code elements of the second code.

Third Aspect

While the prior art systems use the same code for transmission and reception of pulses, under a third aspect of the present invention, transmitted pulses are positioned in time in accordance with code elements of a first code and the pulse train signal is received in accordance with code elements of a second code. In one approach, the second code is different from the first code in that the code elements of the second code comprise the code elements of the first code as well as additional code elements that can serve any suitable purpose, for example, specifying times for measuring interfering signals. Thus, the code elements of the first code correspond to arrival times of the pulses at the receiver and the additional code elements correspond to the interference sample times. Under this arrangement, the predefined quality criterion may be satisfied by changing the additional code elements of the second code. In another approach, the second code is different from the first code in that the second code comprises a subset of the code elements of the first code. Under this arrangement, a receiver employing the second code receives a subset of the pulses transmitted in accordance with the first code, whereas another receiver employing still another code (i.e., a different second code) would receive a different subset of the transmitted pulses.

II. Impulse Radio Technology Overview

Impulse radio has been described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), and U.S. Pat. No. 5,832,035 (issued Nov. 3, 1998) to Fullerton et al.

Uses of impulse radio systems are described in U.S. patent application Ser. No. 09/332,502, titled, "System and Method for Intrusion Detection using a Time Domain Radar Array" and U.S. patent application Ser. No. 09/332,503, titled, "Wide Area Time Domain Radar Array" both filed on Jun. 14, 1999 both of which are assigned to the assignee of the present invention. The above patent documents are incorporated herein by reference.

This section provides an overview of impulse radio technology and relevant aspects of communications theory. It is provided to assist the reader with understanding the present invention and should not be used to limit the scope of the present invention. It should be understood that the terminology 'impulse radio' is used primarily for historical convenience and that the terminology can be generally interchanged with the terminology 'impulse communications system, ultra-wideband system, or ultra-wideband communication system'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, low duty-cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Impulse radio can use many types of modulation, including amplitude modulation, phase modulation, frequency modulation, time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio communications, inter-pulse spacing may be held constant or may be varied on a pulse-by-pulse basis by information, a code, or both. Generally, conventional spread spectrum systems employ codes to spread the normally narrow band information signal over a relatively wide band of frequencies. A conventional spread spectrum receiver correlates these signals to retrieve the original information signal. In impulse radio communications, codes are not typically used for energy spreading because the monocycle pulses themselves have an inherently wide bandwidth. Codes are more commonly used for channelization, energy smoothing in the frequency domain, resistance to interference, and reducing the interference potential to nearby receivers. Such codes are commonly referred to as time-hopping codes or pseudo-noise (PN) codes since their use typically causes inter-pulse spacing to have a seemingly random nature. PN codes may be generated by techniques other than pseudorandom code generation. Additionally, pulse trains having constant, or uniform, pulse spacing are commonly referred to as uncoded pulse trains. A pulse train with uniform pulse spacing, however, may be described by a code that specifies non-temporal, i.e., non-time related, pulse characteristics.

In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Figure 1E:
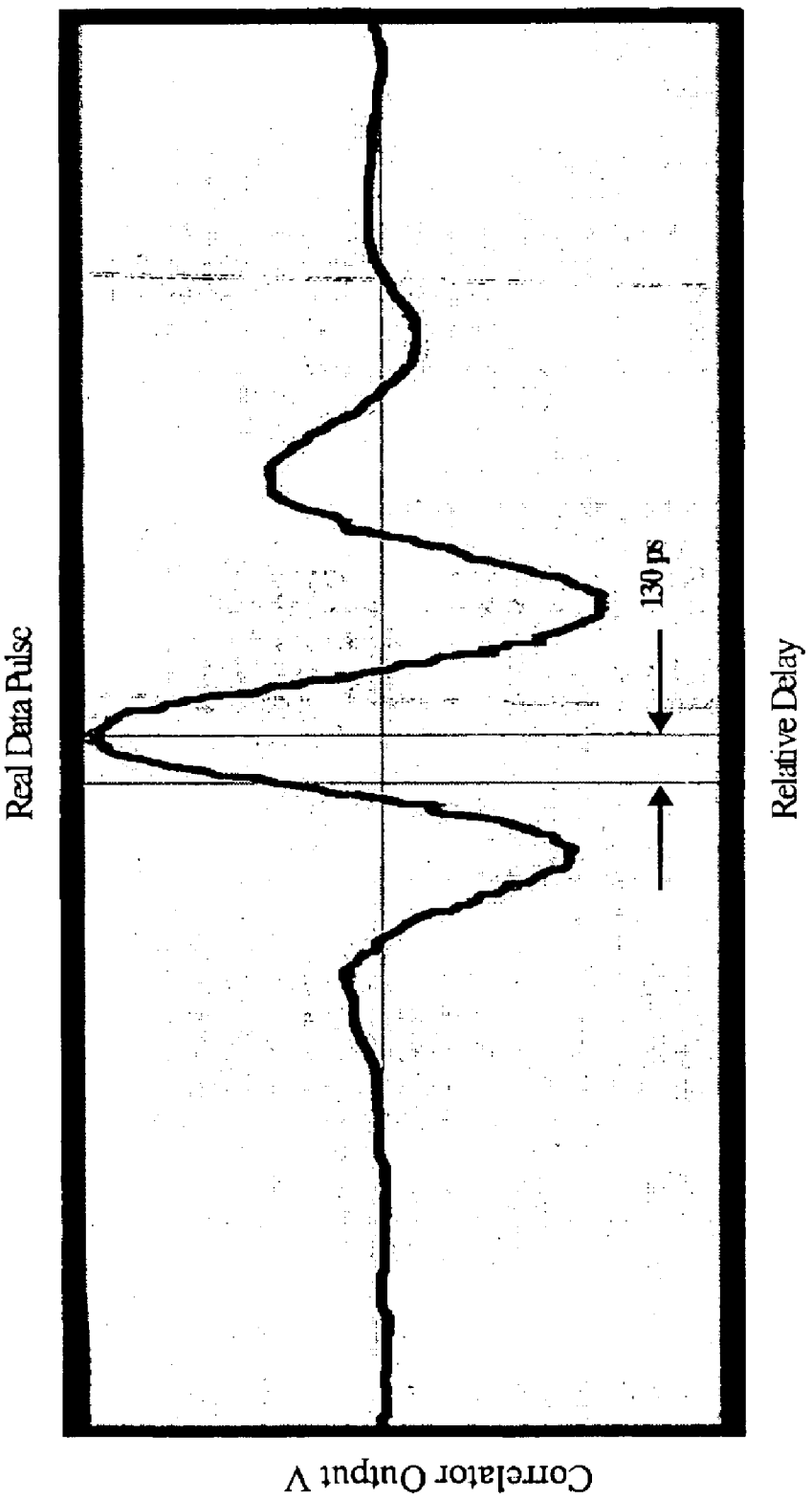
FIG. 1E illustrates an example of an actual pulse quadlet.

Impulse transmission systems are based on short, low duty-cycle pulses. Different pulse waveforms, or pulse types, may be employed to accommodate requirements of various applications. Typical pulse types include a Gaussian pulse, pulse doublet (also referred to as a Gaussian monocycle), pulse triplet, and pulse quadlet as depicted in FIGS. 1A through 1D, respectively. An actual received waveform that closely resembles the theoretical pulse quadlet is shown in FIG. 1E. A pulse type may also be a wavelet set produced by combining two or more pulse waveforms (e.g., a doublet/triplet wavelet set). These different pulse types may be produced by methods described in the patent documents referenced above or by other methods, as persons skilled in the art would understand.

Figure 1F:
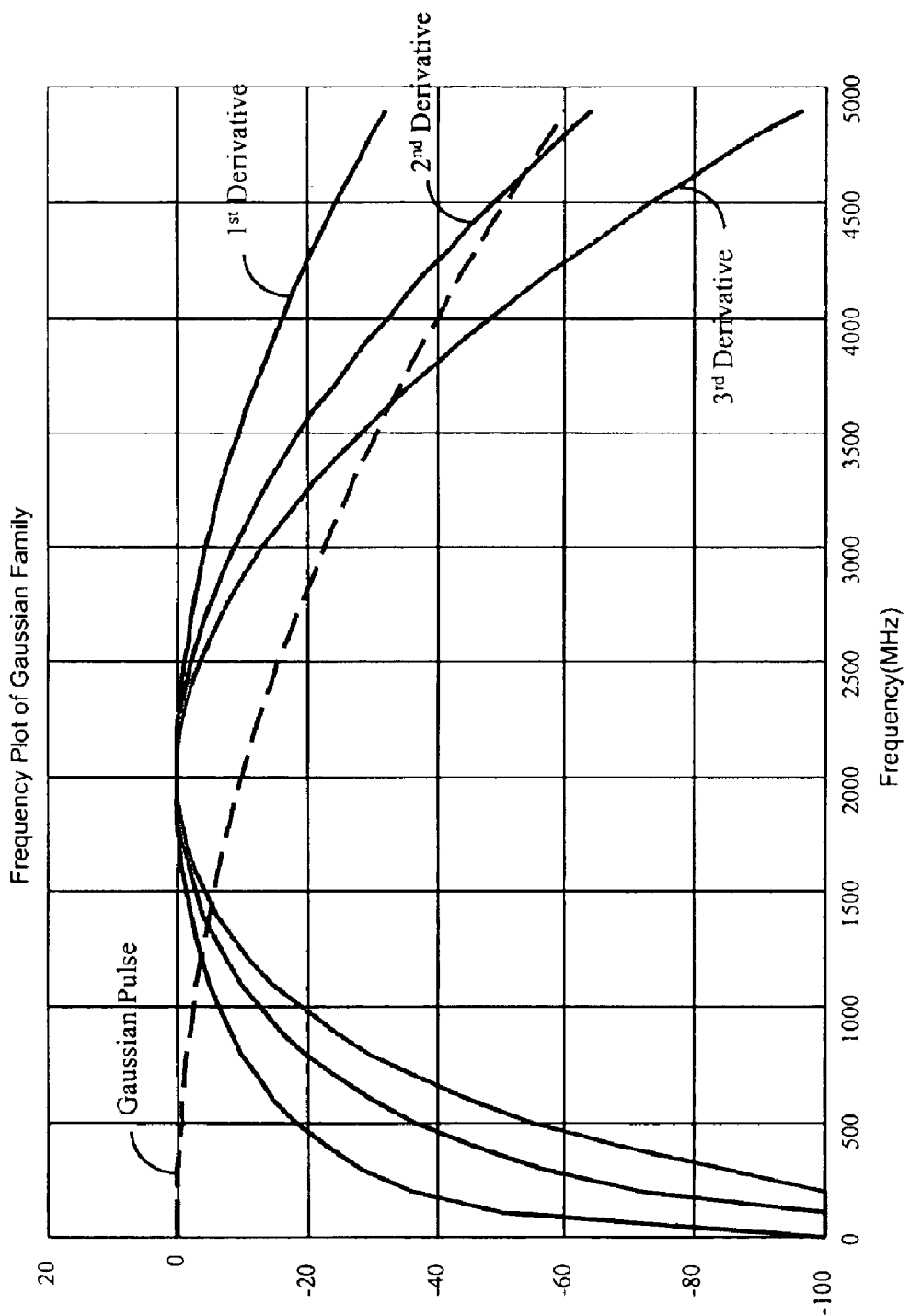
FIG. 1F illustrates a power spectral density of the Gaussian pulses of FIGS. 1A–1D.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where σ is a time scaling parameter, t is time, and e is the natural logarithm base. The power special density of the Gaussian monocycle is shown in FIG. 1F, along with spectrums for the Gaussian pulse, triplet, and quadlet. The corresponding equation for the Gaussian monocycle is:

$$F_{mono}(f) = (2\pi)^{\frac{3}{2}}\sigma f e^{-2(\pi\sigma f)^2}$$

The center frequency ($f_c$), or frequency of peak spectral density, of the Gaussian monocycle is:

$$f_c = \frac{1}{2\pi\sigma}$$

It should be noted that the output of an ultra-wideband antenna is essentially equal to the derivative of its input. Accordingly, since the pulse doublet, pulse triplet, and pulse quadlet are the first, second, and third derivatives of the Gaussian pulse, in an ideal model, an antenna receiving a Gaussian pulse will transmit a Gaussian monocycle and an antenna receiving a Gaussian monocycle will provide a pulse triplet.

Pulse Trains

Impulse transmission systems may communicate one or more data bits with a single pulse; however, typically each data bit is communicated using a sequence of pulses, known as a pulse train. As described in detail in the following example system, the impulse radio transmitter produces and outputs a train of pulses for each bit of information. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems typically have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = (-1)^f a \sum_j \omega(ct - jT_f, b)$$

where j is the index of a pulse within a pulse train, $(-1)^f$ is polarity (+/−), a is pulse amplitude, b is pulse type, c is pulse width, ω(t,b) is the normalized pulse waveform, and $T_f$ is pulse repetition time.

The energy spectrum of a pulse train signal over a frequency bandwidth of interest may be determined by summing the phasors of the pulses at each frequency, using the following equation:

$$A(\omega) = \left|\sum_{i=1}^{n}\frac{e^{j\Delta t}}{n}\right|$$

where A(ω) is the amplitude of the spectral response at a given frequency, ω is the frequency being analyzed (2πf), Δt is the relative time delay of each pulse from the start of time period, and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Coding

Figure 3:
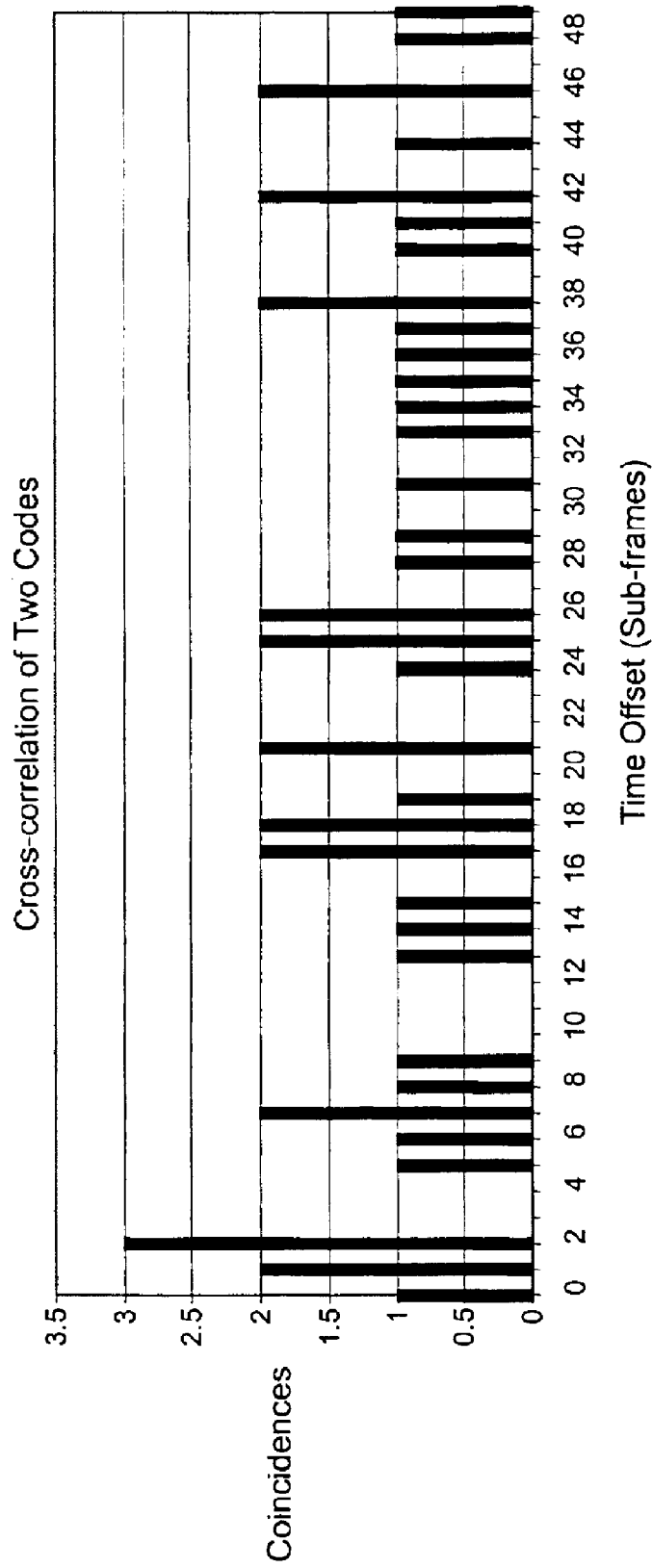
FIG. 3 illustrates cross-correlation properties of two PN codes.

Specialized coding techniques can be employed to specify temporal and/or non-temporal pulse characteristics to produce a pulse train having certain spectral and/or correlation properties. For example, by employing a PN code to vary inter-pulse spacing, the energy in the comb lines presented in FIG. 2B can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses). Coding provides a method of establishing independent communication channels. Specifically, families of codes can be designed such that the number of pulse coincidences between pulse trains produced by any two codes will be minimal. For example, FIG. 3 depicts cross-correlation properties of two codes that have no more than four coincidences for any time offset. Generally, keeping the number of pulse collisions minimal represents a substantial attenuation of the unwanted signal.

Coding can also be used to facilitate signal acquisition. For example, coding techniques can be used to produce pulse trains with a desirable main-lobe-to-side-lobe ratio. In addition, coding can be used to reduce acquisition algorithm search space.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

A fixed or non-fixed characteristic value layout may include a non-allowable region within which a pulse characteristic value is disallowed. A method for specifying non-allowable regions is described in co-owned, co-pending application titled "A Method for Specifying Non-Allowable Pulse Characteristics," application Ser. No. 09/592,289, filed Jun. 12, 2000, and incorporated herein by reference. A related method that conditionally positions pulses depending on whether code elements map to non-allowable regions is described in co-owned, co-pending application, titled "A Method and Apparatus for Positioning Pulses Using a Layout having Non-Allowable Regions," application Ser. No. 09/592,248 filed Jun. 12, 2000, and incorporated herein by reference.

The signal of a coded pulse train can be generally expressed by:

$$s_{tr}^{(k)}(t) = \sum_{j} (-1)^{f_j^{(k)}} a_j^{(k)} \omega(c_j^{(k)} t - T_j^{(k)}, b_j^{(k)})$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t,b_j^{(k)})$ are the coded polarity, pulse amplitude, pulse type, pulse width, and normalized pulse waveform of the jth pulse of the kth transmitter, and $T_j^{(k)}$ is the coded time shift of the jth pulse of the kth transmitter. Note: When a given non-temporal characteristic does not vary (i.e., remains constant for all pulses), it becomes a constant in front of the summation sign.

Various numerical code generation methods can be employed to produce codes having certain correlation and spectral properties. Such codes typically fall into one of two categories: designed codes and pseudorandom codes. A designed code may be generated using a quadratic congruential, hyperbolic congruential, linear congruential, Costas array, or other such numerical code generation technique designed to generate codes having certain correlation properties. A pseudorandom code may be generated using a computer's random number generator, binary shift-register (s) mapped to binary words, a chaotic code generation scheme, or the like. Such 'random-like' codes are attractive for certain applications since they tend to spread spectral energy over multiple frequencies while having 'good enough' correlation properties, whereas designed codes may have superior correlation properties but possess less suitable spectral properties. Detailed descriptions of numerical code generation techniques are included in a co-owned, co-pending patent application titled "A Method and Apparatus for Positioning Pulses in Time," application Ser. No. 09/592,248, filed Jun. 12, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in co-owned, co-pending application, titled "A Method and Apparatus for Specifying Pulse Characteristics using a Code that Satisfies Predefined Criteria," application Ser. No. 09/592,288, filed Jun. 12, 2000, and incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in particular spectral properties. A method for applying code combinations is described in co-owned, co-pending application, titled "A Method and Apparatus for Applying Codes Having Pre-Defined Properties," application Ser. No. 09/591,690, filed Jun. 12, 2000, and incorporated herein by reference.

Modulation

Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Thus, each pulse in a train of pulses is typically delayed a different amount from its respective time base clock position by an individual code delay amount plus a modulation time shift. This modulation time shift is normally very small relative to the code shift. In a 10 Mpps system with a center frequency of 2 GHz, for example, the code may command pulse position variations over a range of 100 ns, whereas the information modulation may shift the pulse position by 150 ps. This two-state 'early-late' form of time shift modulation is depicted in FIG. 4A.

A pulse train with conventional 'early-late' time-shift modulation can be expressed:

$$s_{tr}^{(k)}(t) = \sum_j (-1)^{f_j^{(k)}} a_j^{(k)} \omega(c_j^{(k)} t - T_j^{(k)} - \delta d_{\lfloor j/N_s \rfloor}^{(k)}, b_j^{(k)})$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t,b_j^{(k)})$ are the coded polarity, pulse amplitude, pulse type, pulse width, and normalized pulse waveform of the jth pulse of the kth transmitter, $T_j^{(k)}$ is the coded time shift of the jth pulse of the kth transmitter, $\delta$ is the time shift added when the transmitted symbol is 1 (instead of 0), $d^{(k)}$ is the data (i.e., 0 or 1) transmitted by the kth transmitter, and $N_s$ is the number of pulses per symbol (e.g., bit). Similar expressions can be derived to accommodate other proposed forms of modulation.

An alternative form of time-shift modulation can be described as One-of-Many Position Modulation (OMPM). The OMPM approach, shown in FIG. 4B, involves shifting a pulse to one of N possible modulation positions about a nominal coded (or uncoded) time position in response to an information signal, where N represents the number of possible states. For example, if N were four (4), two data bits of information could be conveyed. For further details regarding OMPM, see "Apparatus, System and Method for One-of-Many Position Modulation in an Impulse Radio Communication System," Ser. No. 60/209,857,filed Jun. 7, 2000, assigned to the assignee of the present invention, and incorporated herein by reference.

An impulse radio communications system can employ flip modulation techniques to convey information. The simplest flip modulation technique involves transmission of a pulse or an inverted (or flipped) pulse to represent a data bit of information, as depicted in FIG. 4C. Flip modulation techniques may also be combined with time-shift modulation techniques to create two, four, or more different data states. One such flip with shift modulation technique is referred to as Quadrature Flip Time Modulation (QFTM). The QFTM approach is illustrated in FIG. 4D. Flip modulation techniques are further described in patent application titled "Apparatus, System and Method for Flip Modulation in an Impulse Radio Communication System," application Ser. No. 09/537,692, filed Mar. 29, 2000, assigned to the assignee of the present invention, and incorporated herein by reference.

Vector modulation techniques may also be used to convey information. Vector modulation includes the steps of generating and transmitting a series of time-modulated pulses, each pulse delayed by one of at least four pre-determined time delay periods and representative of at least two data bits of information, and receiving and demodulating the series of time-modulated pulses to estimate the data bits associated with each pulse. Vector modulation is shown in FIG. 4E. Vector modulation techniques are further described in patent application titled "Vector Modulation System and Method for Wideband Impulse Radio Communications," application Ser. No. 09/169,765, filed Dec. 9, 1999, assigned to the assignee of the present invention, and incorporated herein by reference.

Reception and Demodulation

Figure 5A:
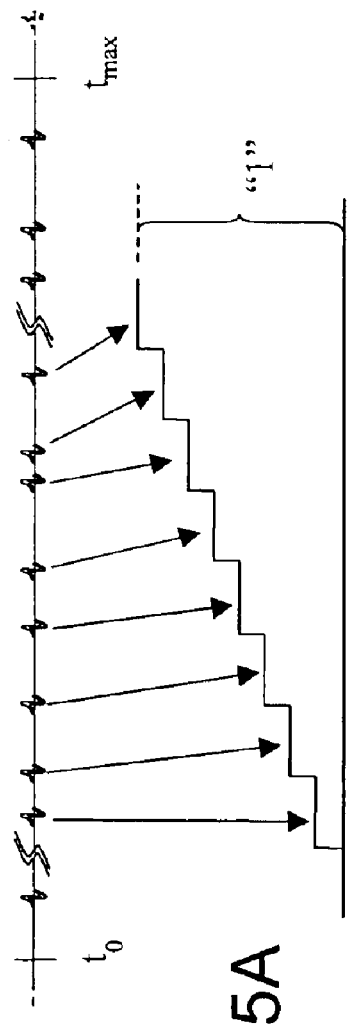
FIG. 5A shows an ideal long-term integration up-ramp corresponding to a bit "1"
Figure 5B:
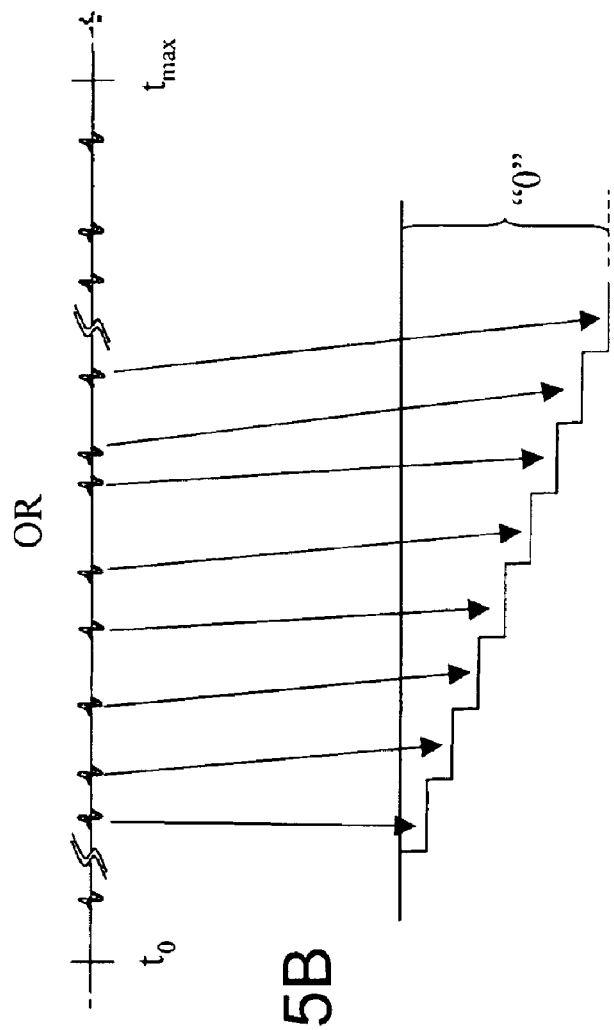
FIG. 5B shows an ideal long-term integration down-ramp corresponding to a bit "0"
Figure 6A:
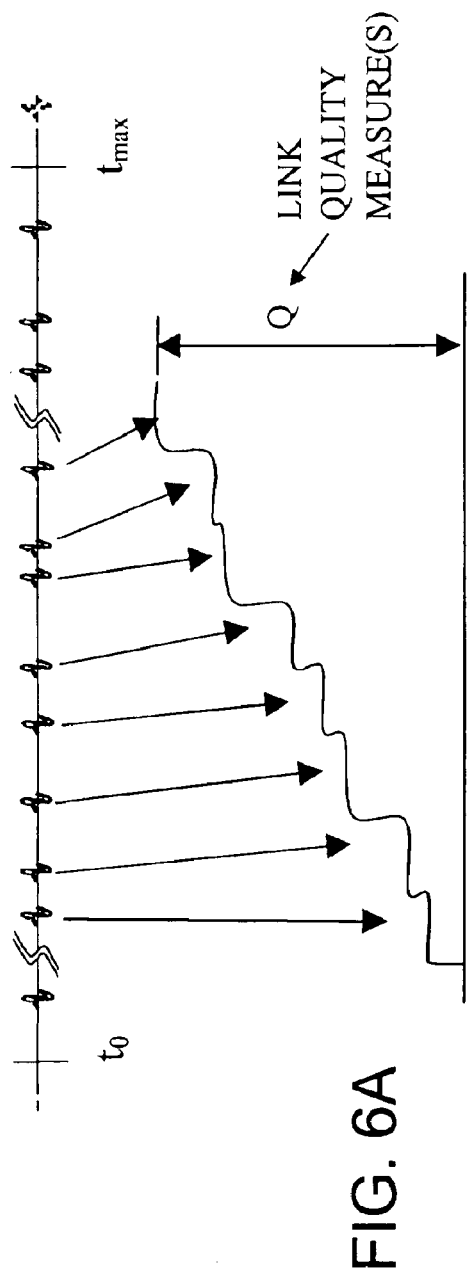
FIG. 6 A shows proximate shape of an up-ramp in the presence of interference and noise.
FIG. 6B shows normal distribution of peak points of a number of up-ramps.
Figure 6B:
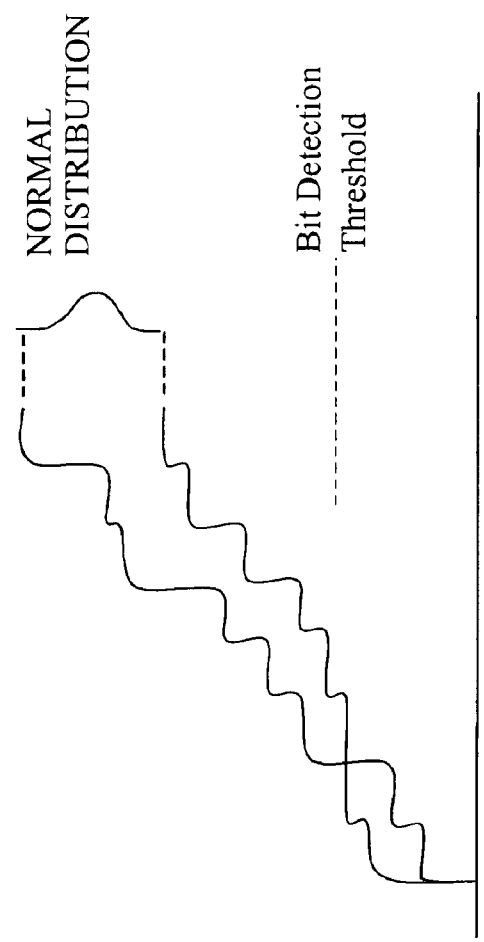

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they do not depend on receiving every transmitted pulse. Impulse radio receivers perform a correlating, synchronous receiving function (at the RF level) that uses statistical sampling and combining, or integration, of many pulses to recover transmitted information. Typically, a number of pulses, for example, 1 to 1000 or more pulses, are integrated to yield a single data bit (also known as long-term integration) thus diminishing the impact of individual pulse collisions, where the number of pulses that must be integrated to successfully recover transmitted information depends on a number of variables including pulse rate, bit rate, range and interference levels. FIGS. 5A and 5B depict correlated pulses being integrated equally under ideal conditions, i.e., without the presence of interference and noise. FIG. 5A shows the long-term integration process for pulses modulated to produce an up-ramp corresponding to a bit "1". Similarly, FIG. 5B shows the long-term integration process for pulses modulated to produce a down-ramp corresponding to a bit "0". Under real operating conditions, the presence of interference and noise would cause the pulses to integrate unequally. FIG. 6A shows the proximate shape of an up-ramp in the presence of interference and noise where the pulses have integrated unequally. Because of unequal integration in the presence of interference and noise, the resulting long-term integration for the binary bits has a normal distribution. FIG. 6B illustrates that peak points of the up-ramps representing binary bit 1 follow a normal distribution curve. Although not shown, the same principal holds true for the long-term integrations that result in down-ramps representing binary bits 0. In order to detect the received binary bits reliably, bit detection thresholds are selected to accommodate such normal distribution based on predefined statistical parameters. A detection threshold is depicted in FIG. 6B.

Interference Resistance

Besides providing channelization and energy smoothing, coding makes impulse radios highly resistant to interference by enabling discrimination between intended impulse transmissions and interfering transmissions. This property is desirable since impulse radio systems must share the energy spectrum with conventional radio systems and with other impulse radio systems.

Figure 7A:
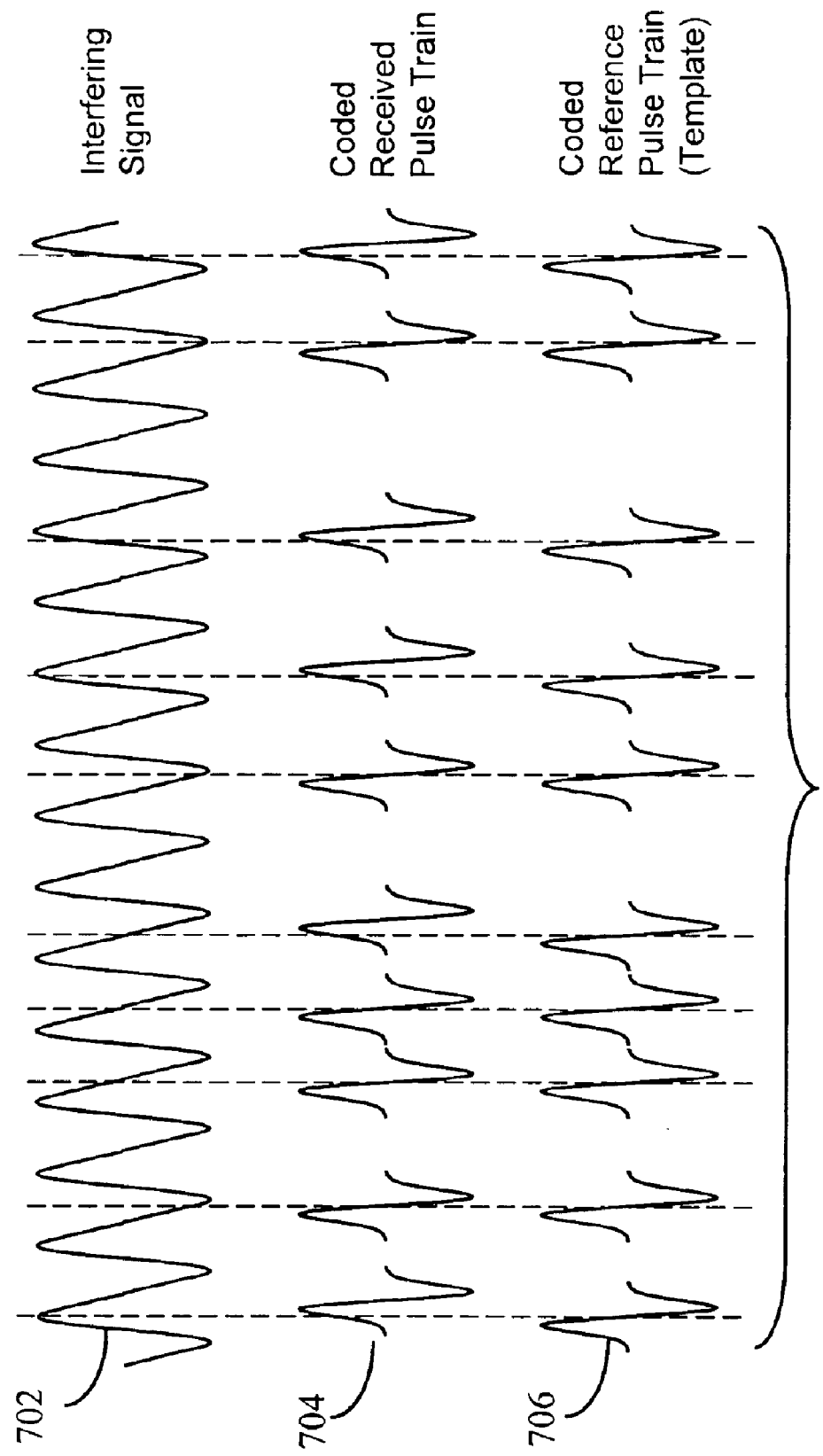
FIG. 7A illustrates the result of a narrow band sinusoidal interference signal overlaying an impulse radio signal.

FIG. 7A illustrates the result of a narrow band sinusoidal interference signal 702 overlaying an impulse radio signal 704. At the impulse radio receiver, the input to the cross correlation would include the narrow band signal 702 and the received ultrawide-band impulse radio signal 704. The input is sampled by the cross correlator using a template signal 706 positioned in accordance with a code. Without coding, the cross correlation would sample the interfering signal 702 with such regularity that the interfering signals could cause interference to the impulse radio receiver. However, when the transmitted impulse signal is coded and the impulse radio receiver template signal 706 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a direct sequence spread spectrum system with a 10 KHz information bandwidth and a 10 MHz channel bandwidth yields a processing gain of 1000, or 30 dB. However, far greater processing gains are achieved by impulse radio systems, where the same 10 KHz information bandwidth is spread across a much greater 2 GHz channel bandwidth, resulting in a theoretical processing gain of 200,000, or 53 dB.

Capacity

It can be shown theoretically, using signal-to-noise arguments, that thousands of simultaneous channels are available to an impulse radio system as a result of its exceptional processing gain.

The average output signal-to-noise ratio of the impulse radio may be calculated for randomly selected time-hopping codes as a function of the number of active users, $N_u$, as:

$$SNR_{out}(N_u) = \frac{(N_s A_1 m_p)^2}{\sigma_{rec}^2 + N_s \sigma_a^2 \sum_{k=2}^{N_u} A_k^2}$$

where $N_s$ is the number of pulses integrated per bit of information, $A_k$ models the attenuation of transmitter k's signal over the propagation path to the receiver, and $\sigma_{rec}^2$ is the variance of the receiver noise component at the pulse train integrator output. The monocycle waveform-dependent parameters $m_p$ and $\sigma_a^2$ are given by $$m_p = \int_{-\infty}^{\infty} \omega(t)[\omega(t) - \omega(t-\delta)]dt$$

and $$\sigma_a^2 = T_f^{-1} \int_{-\infty}^{\infty} \left[\int_{-\infty}^{\infty} \omega(t-s)v(t)dt\right]^2 ds,$$

where $\omega(t)$ is the monocycle waveform, $v(t)=\omega(t)-\omega(t-\delta)$ is the template signal waveform, $\delta$ is the time shift between the monocycle waveform and the template signal waveform, $T_f$ is the pulse repetition time, and s is signal.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents the majority of the potential coverage area of a radio system. In a mobile system, received signal strength fluctuates due to the changing mix of multipath signals that vary as its position varies relative to fixed transmitters, mobile transmitters and signal-reflecting surfaces in the environment.

Impulse radios, however, can be substantially resistant to multipath effects. Impulses arriving from delayed multipath reflections typically arrive outside of the correlation time and, thus, may be ignored. This process is described in detail with reference to FIGS. 7B and 7C. FIG. 7B illustrates a typical multipath situation, such as in a building, where there are many reflectors 704B, 705B. In this figure, a transmitter 706B transmits a signal that propagates along three paths, the direct path 701B, path 1 702B, and path2 703B, to a receiver 708B, where the multiple reflected signals are combined at the antenna. The direct path 701B, representing the straight-line distance between the transmitter and receiver, is the shortest. Path 1 702B represents a multipath reflection with a distance very close to that of the direct path. Path 2 703B represents a multipath reflection with a much longer distance. Also shown are elliptical (or, in space, ellipsoidal) traces that represent other possible locations for reflectors that would produce paths having the same distance and thus the same time delay.

Figure 7C:
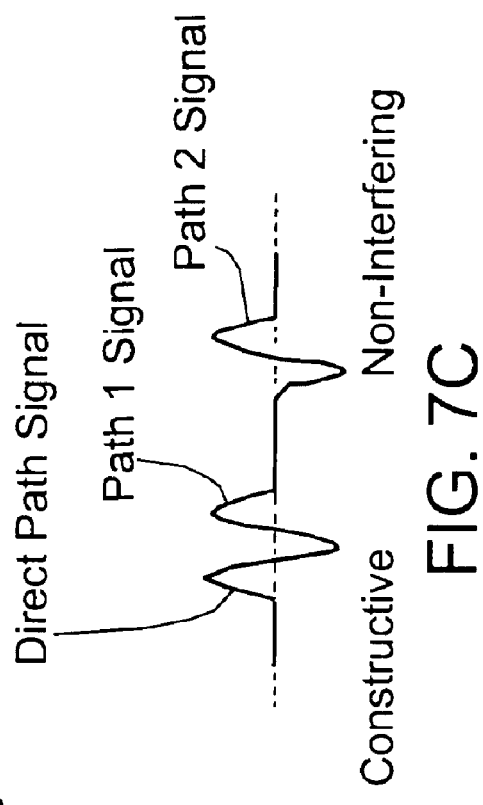
FIG. 7C illustrates the received composite pulse waveform resulting from the three propagation paths shown in FIG. 7B.
Figure 7B:
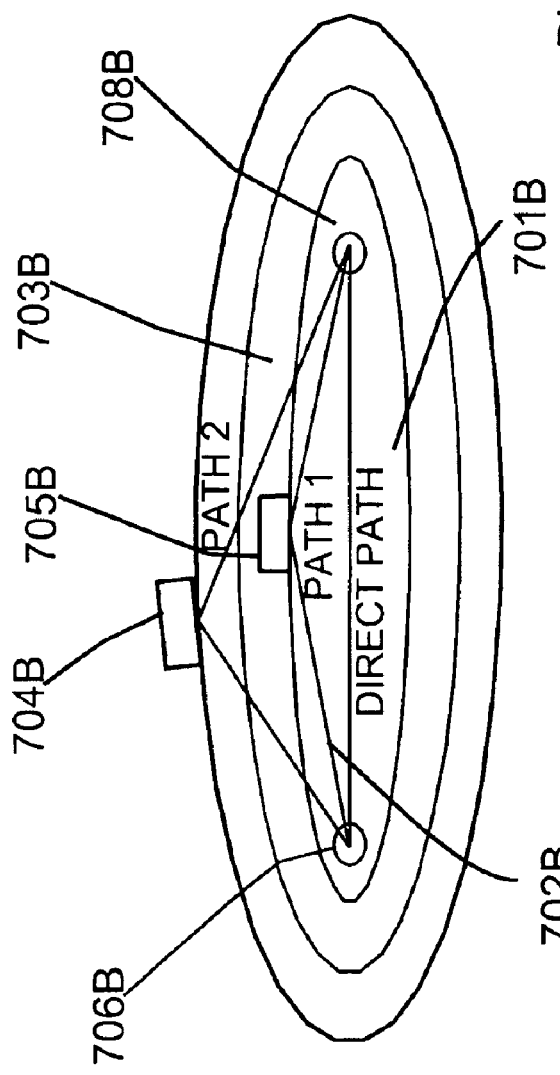
FIG. 7B illustrates a typical multipath situation.

FIG. 7C illustrates the received composite pulse waveform resulting from the three propagation paths 701B, 702B, and 703B shown in FIG. 7B. In this figure, the direct path signal 701B is shown as the first pulse signal received. The path 1 and path 2 signals 702B, 703B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

FIGS. 7D, 7E, and 7F represent the received signal from a TM-UWB transmitter in three different multipath environments. These figures are approximations of typical signal plots. FIG. 7D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 7E illustrates an intermediate multipath environment. This approximates the response from one room to the next in a building. The amplitude of the direct path signal is less than in FIG. 7D and several reflected signals are of significant amplitude. FIG. 7F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 7E. In this situation, the direct path signal power is small relative to the total signal power from the reflections.

Figure 7G:
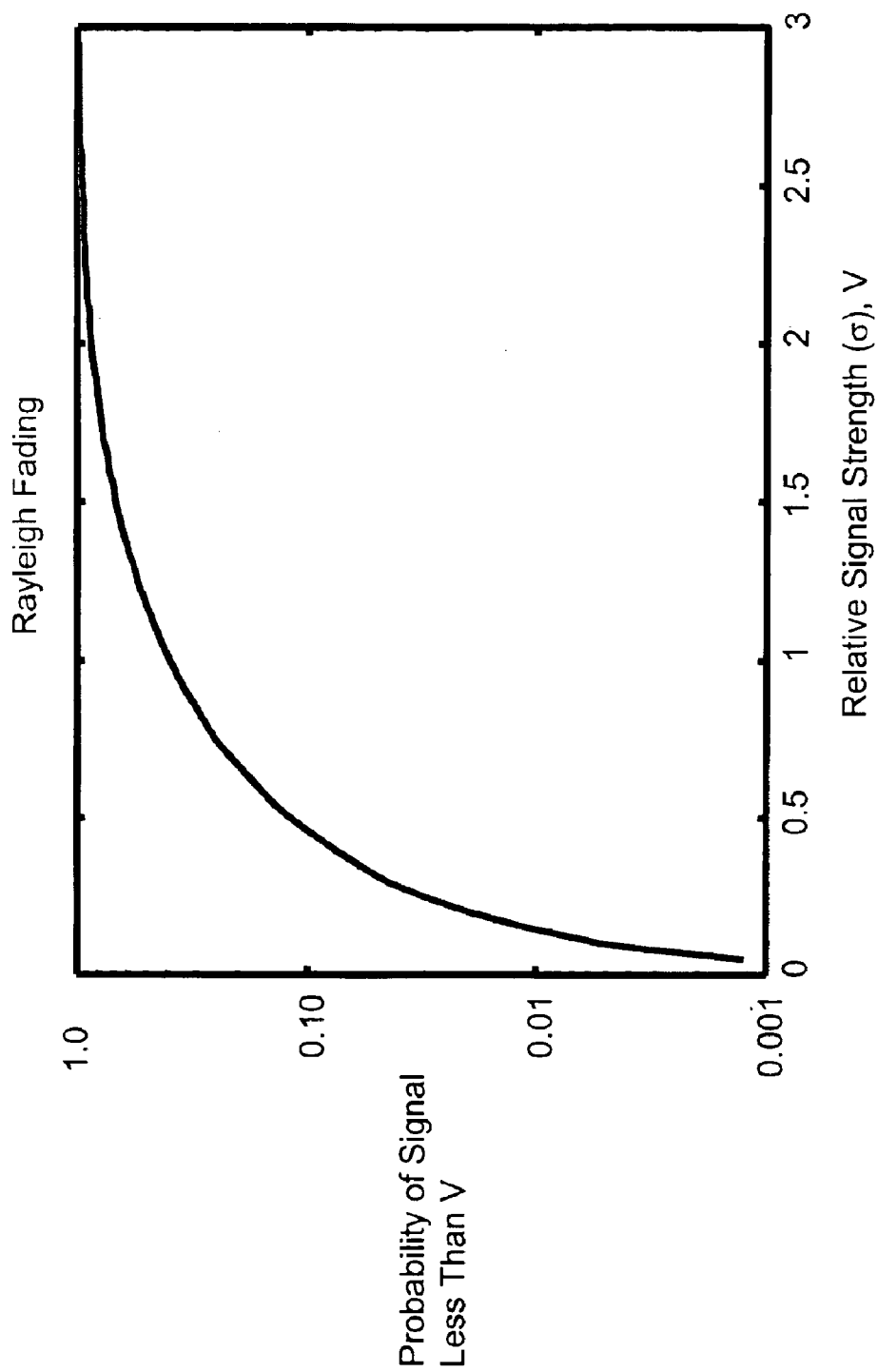
FIG. 7G illustrates a Rayleigh distribution curve for a typical multi-path environment.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of mulitipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Where the system of FIG. 7B is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sigma(2)^{1/2}$ is the RMS power of the combined multipath signals. The Rayleigh distribution curve in FIG. 7G shows that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 7H:
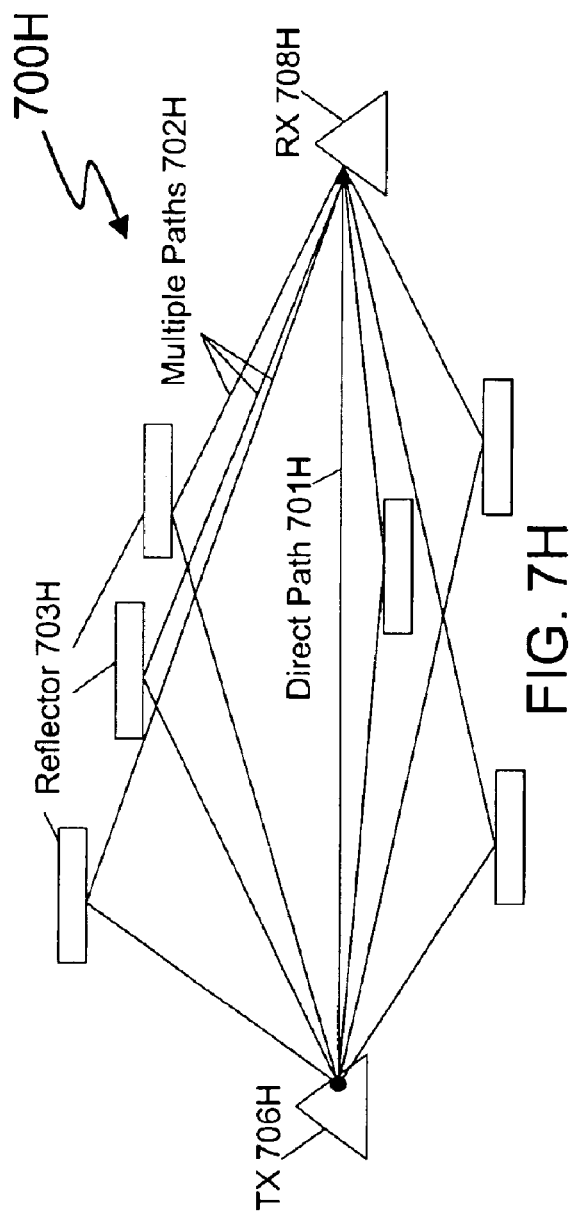
FIG. 7H illustrates an impulse radio system in a high multipath environment.
Figure 7I:
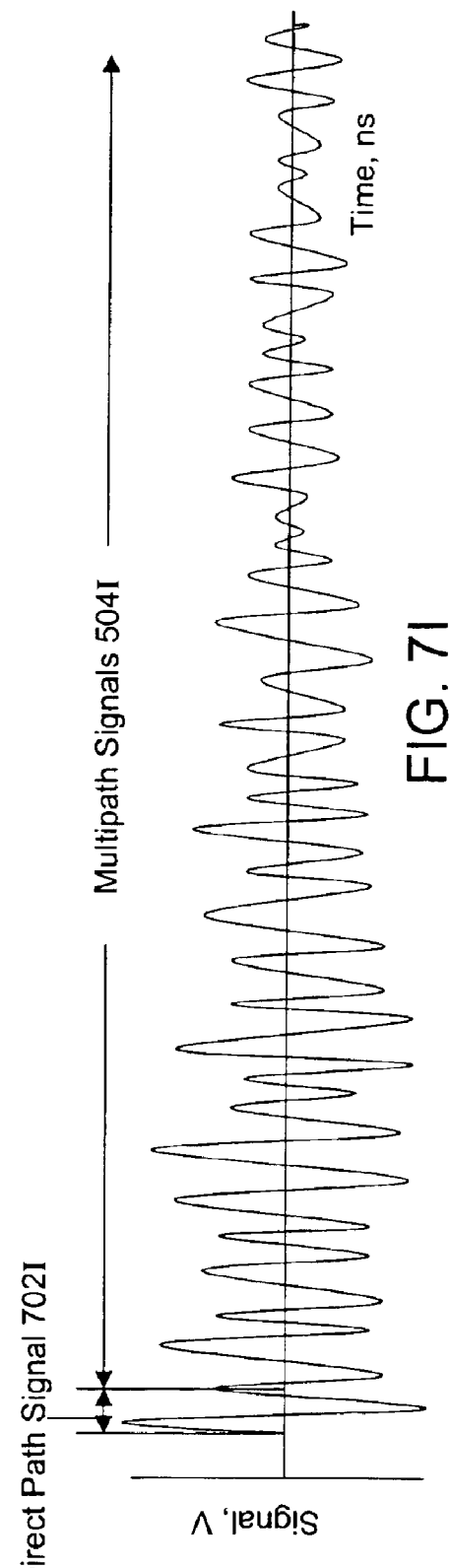
FIG. 7I illustrates the combined signal received in FIG. 5H over time.

In a high multipath environment such as inside homes, offices, warehouses, automobiles, trailers, shipping containers, or outside in an urban canyon or other situations where the propagation is such that the received signal is primarily scattered energy, impulse radio systems can avoid the Rayleigh fading mechanism that limits performance of narrow band systems, as illustrated in FIGS. 7H and 7I. FIG. 7H depicts an impulse radio system in a high multipath environment 700H consisting of a transmitter 706H and a receiver 708H. A transmitted signal follows a direct path 701H and reflects off reflectors 703H via multiple paths 702H. FIG. 7I illustrates the combined signal received by the receiver 708H over time with the vertical axis being signal strength in volts and the horizontal axis representing time in nanoseconds. The direct path 701H results in the direct path signal 702I while the multiple paths 702H result in multipath signals 704I. In the same manner described earlier for FIGS. 7B and 7C, the direct path signal 702I is sampled, while the multipath signals 704I are not, resulting in Rayleigh fading avoidance.

Exemplary Transceiver Implementation

Transmitter

An exemplary embodiment of an impulse radio transmitter 802 of an impulse radio communication system having an optional subcarrier channel will now be described with reference to FIG. 8.

The transmitter 802 comprises a time base 804 that generates a periodic timing signal 806. The time base 804 typically comprises a voltage controlled oscillator (VCO), or the like, having a high timing accuracy and low jitter, on the order of picoseconds (ps). The control voltage to adjust the VCO center frequency is set at calibration to the desired center frequency used to define the transmitter's nominal pulse repetition rate. The periodic timing signal 806 is supplied to a precision timing generator 808.

The precision timing generator 808 supplies synchronizing signals 810 to the code source 812 and utilizes the code source output 814, together with an optional, internally generated subcarrier signal, and an information signal 816, to generate a modulated, coded timing signal 818.

An information source 820 supplies the information signal 816 to the precision timing generator 808. The information signal 816 can be any type of intelligence, including digital bits representing voice, data, imagery, or the like, analog signals, or complex signals. A pulse generator 822 uses the modulated, coded timing signal 818 as a trigger signal to generate output pulses. The output pulses are provided to a transmit antenna 824 via a transmission line 826 coupled thereto. The output pulses are converted into propagating electromagnetic pulses by the transmit antenna 824. The electromagnetic pulses are called the emitted signal, and propagate to an impulse radio receiver 702, such as shown in FIG. 7, through a propagation medium. In a preferred embodiment, the emitted signal is wide-band or ultrawide-band, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

An exemplary embodiment of an impulse radio receiver (hereinafter called the receiver) for the impulse radio communication system is now described with reference to FIG. 9. The receiver 902 comprises a receive antenna 904 for receiving a propagated impulse radio signal 906. A received signal 908 is input to a cross correlator or sampler 910, via a receiver transmission line, coupled to the receive antenna 904. The cross correlation 910 produces a baseband output 912. The receiver 902 also includes a precision timing generator 914, which receives a periodic timing signal 916 from a receiver time base 918. This time base 918 may be adjustable and controllable in time, frequency, or phase, as required by the lock loop in order to lock on the received signal 908. The precision timing generator 914 provides synchronizing signals 920 to the code source 922 and receives a code control signal 924 from the code source 922. The precision timing generator 914 utilizes the periodic timing signal 916 and code control signal 924 to produce a coded timing signal 926. The template generator 928 is triggered by this coded timing signal 926 and produces a train of template signal pulses 930 ideally having waveforms substantially equivalent to each pulse of the received signal 908. The code for receiving a given signal is the same code utilized by the originating transmitter to generate the propagated signal. Thus, the timing of the template pulse train matches the timing of the received signal pulse train, allowing the received signal 908 to be synchronously sampled in the correlator 910. The correlator 910 preferably comprises a multiplier followed by a short term integrator to sum the multiplier product over the pulse interval. The output of the correlator 910 is coupled to a subcarrier demodulator 932, which demodulates the subcarrier information signal from the optional subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 934. A digital system embodiment is shown in FIG. 9. In this digital system, a sample and hold 936 samples the output 935 of the pulse summation stage 934 synchronously with the completion of the summation of a digital bit or symbol. The output of sample and hold 936 is then compared with a nominal zero (or reference) signal output in a detector stage 938 to provide an output signal 939 representing the digital state of the output voltage of sample and hold 936.

The baseband signal 912 is also input to a lowpass filter 942 (also referred to as lock loop filter 942). A control loop comprising the lowpass filter 942, time base 918, precision timing generator 914, template generator 928, and correlator 910 is used to generate an error signal 944. The error signal 944 provides adjustments to the adjustable time base 918 to position in time the periodic timing signal 926 in relation to the position of the received signal 908.

In a transceiver embodiment, substantial economy can be achieved by sharing part or all of several of the functions of the transmitter 602 and receiver 902. Some of these include the time base 918, precision timing generator 914, code source 922, antenna 904, and the like.

FIGS. 10A–10C illustrate the cross correlation process and the correlation function. FIG. 10A shows the waveform of a template signal. FIG. 10B shows the waveform of a received impulse radio signal at a set of several possible time offsets. FIG. 10C represents the output of the cross correlator for each of the time offsets of FIG. 10B. For any given pulse received, there is a corresponding point that is applicable on this graph. This is the point corresponding to the time offset of the template signal used to receive that pulse. Further examples and details of precision timing can be found described in U.S. Pat. No. 5,677,927, and commonly owned co-pending application application Ser. No. 09/146,524, filed Sep. 3, 1998, titled "Precision Timing Generator System and Method," both of which are incorporated herein by reference.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics. Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Methods to improve the speed at which a receiver can acquire and lock onto an incoming impulse radio signal have been developed. In one approach, a receiver includes an adjustable time base to output a sliding periodic timing signal having an adjustable repetition rate and a decode-timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in more detail in U.S. Pat. No. 5,832,035 to Fullerton, incorporated herein by reference.

In another approach, a receiver obtains a template pulse train and a received impulse radio signal. The receiver compares the template pulse train and the received impulse radio signal. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, see the patent application titled "Method and System for Fast Acquisition of Ultra Wideband Signals," application Ser. No. 09/538,292, filed Mar. 29, 2000, assigned to the assignee of the present invention, and incorporated herein by reference.

A receiver has been developed that includes a baseband signal converter device and combines multiple converter circuits and an RF amplifier in a single integrated circuit package. For greater elaboration of this receiver, see the patent application titled "Baseband Signal Converter for a Wideband Impulse Radio Receiver," application Ser. No. 09/356,384, filed Jul. 16, 1999, assigned to the assignee of the present invention, and incorporated herein by reference.

III. Improving Received Signal Quality

Measuring Interference

The impulse radio system of the present invention includes an impulse transmitter, such as the one described in connection with FIG. 8. As described, the transmitter 802 transmits a pulse train that conveys an information signal. Once transmitted via antenna 824, the pulse train becomes subject to interference present within the transmission medium, i.e., air. The impulse radio system also includes an impulse receiver, such as the one described in connection with FIG. 9, which receives the transmitted pulse train and various interfering signals at the antenna 904. After the antenna 904, the pulse train and the interfering signals produce a received pulse train signal at the receiver 902. FIG. 11a shows a diagram of one such received pulse train signal that in addition to interfering signals includes pulses that are received at the receiver in accordance with arrival times known to the receiver. The impulse receiver 902 recovers the information signal from the received pulse train signal by correlating each received pulse with a template signal in accordance with a known arrival time. Other pulse characteristics, including pulse amplitude, pulse width, pulse polarity; and pulse type, can be defined in accordance with a layout in the impulse communication of the present invention.

As described above, each state of the information signal (e.g., binary one or zero) is determined by integrating the output of a correlator, which includes the pulse summation stage 934 of FIG. 9, over a number of pulses. Depending on the state of the recovered signal, the output of the correlator can either be an up-ramp or a down-ramp signal. At the detector stage 934 of FIG. 9, the ramp signal is compared against a defined threshold to determine the state of the recovered signal. FIG. 11a shows a ramp produced by the long-term integration of the recovered pulses over a $t_0$ to $t_{max}$ period. During this period, each pulse contributes to building a ramp that, depending on the binary state of the transmitted signal, can be either an up-ramp or a down-ramp. As can be seen, the exemplary diagram of FIG. 11a shows an up-ramp being built over the period.

The present invention improves the received signal quality of a recovered information signal by removing interference measured at interference sample times. The interference sample times can be discrete times or time durations over which the interference samples are measured. In fact, the interference samples can be measured by correlating a template signal, which can have a variable shape, over each sample time duration. The interference samples are removed from the received pulse train by adjusting the recovered information signal based on the measured interference samples. FIG. 11a shows interference samples at one or more interference sample times that do not coincide with the arrival times of the pulses. The interference sample times can be relative to the position of the pulses in time. Thus, the interference samples are measured at interference sample times that do not coincide with the arrival times of the pulses at the receiver. Interference sample times may precede, succeed or be intermixed with pulse arrival times. In another embodiment, the interference sample times can be specified to be within non-allowable regions, where pulses may not be positioned.

Adjusting for Interference

The received signal quality improvement under the present invention requires determining one or more received signal quality measures and varying the interference sample times until the signal quality measure(s) satisfy a predefined signal quality criterion. In order to satisfy the predefined signal quality criterion, the present invention measures interference samples at the interference samples times and modifies the received pulse train signal in accordance with the measured interference samples.

Figure 11B:
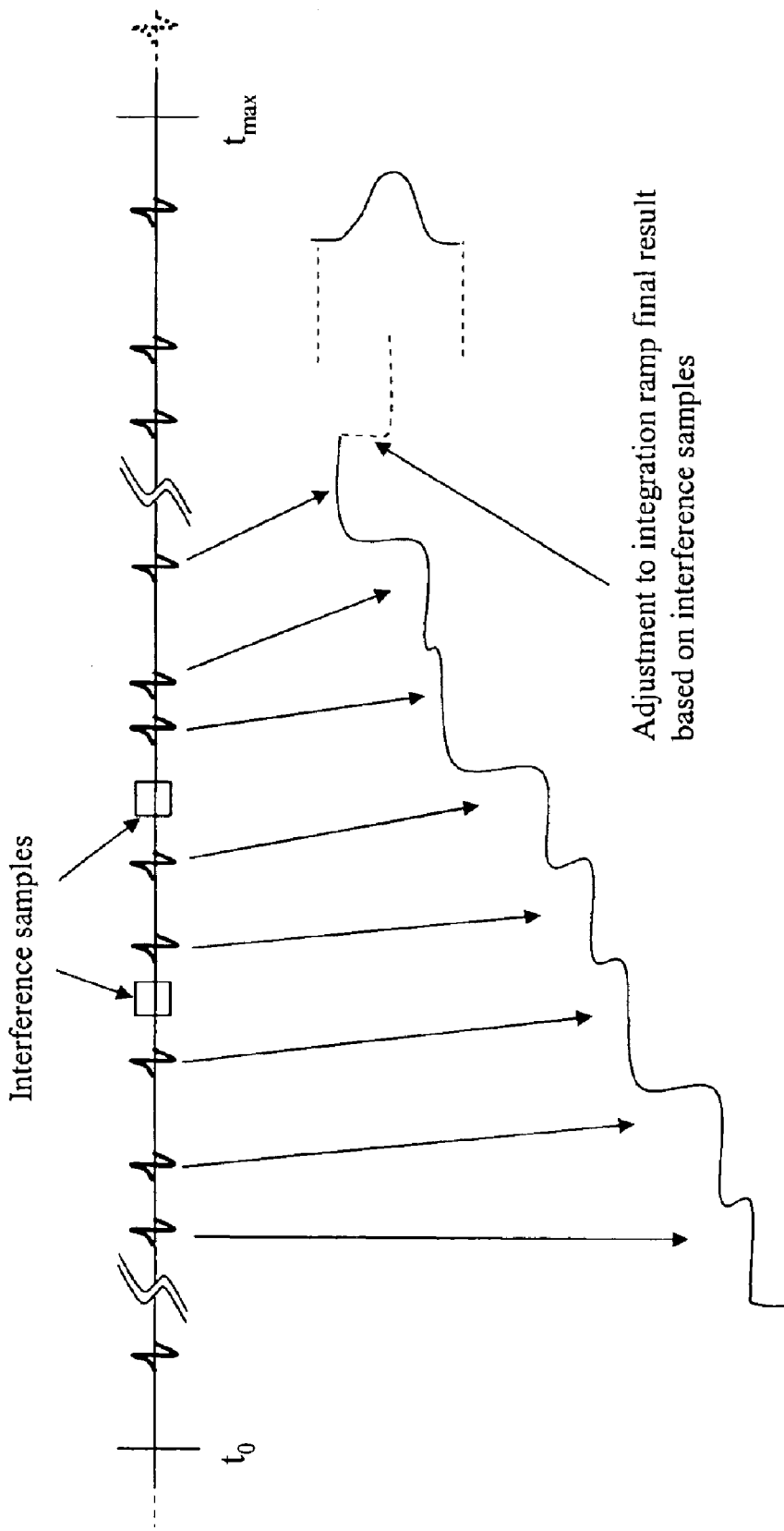
FIG. 11b illustrates a pulse train diagram and adjustment of a ramp signal in accordance with another embodiment of the present invention.

The modification of the received pulse train signal may include adjusting the integration ramp signal based on the measured interference samples. The dotted lines at each step of the ramp signal shown in FIG. 11a show the adjustments being made while the ramp signal is built. As shown, the measured interference sample is removed from the ramp signal as each interference sample is measured. In another embodiment, shown in FIG. 11b, a single adjustment is made to the ramp signal after the ramp is built. Under this embodiment, a final adjustment equal to the total amount of interference sample measurements is made to the ramp signal to remove interference from the recovered information signal. Accordingly, interference is removed from the received pulse train signal by adjusting (i.e., increasing or decreasing) the ramp signal level in accordance with at least one measured interference sample, before comparing the signal level against a threshold that is used for recovering the information signal.

The adjustment or modification of the received pulse train signal can also be based on weighting factors. In one embodiment, each measured interference sample is multiplied by a weighting factor before it is used to modify the pulse train signal. In another embodiment, multiple measured interference samples can be weighted in accordance with a weighting curve before they are used to modify the received pulse train signal.

One or more signal quality criteria can be specified that define a desirable received signal quality. In order to achieve the desirable received signal quality, the receiver measures parameters that are indicative of the quality of the received pulse train signal, for example, a received signal strength value, bit-error-rate, or signal-to-noise ratio. The receiver then compares the received signal quality measure to an established quality criterion. The received signal quality measure can be determined, for example, periodically, for an individual pulse or for a plurality of pulses, such as all of the pulses of the received pulse train signal or a subset of the pulses. As stated above, modifications to the received pulse train signal may occur while a ramp is built or after a ramp is built. Accordingly, a received signal quality measure can pertain to the received pulse train signal or the received pulse train signal combined with interference samples.

Varying Interference Samples

The present invention can vary interference sample times to satisfy a received signal quality criterion. Varying interference sample times may involve shifting the position of interference sample times or changing the number of interference sample times. The positioning of interference samples can be varied whether the interference samples are discreet samples or samples having some time duration. In one embodiment, after each variation of the positioning of one or more interference samples, a received signal quality measure is made and the received pulse train signal is modified. This process is repeated until the best possible received signal quality that can be achieved is determined. Alternatively, interference sample times can be varied until the received signal quality satisfies a signal quality criterion, for example a signal-to-noise threshold.

The present invention can vary the duration of interference samples, i.e., samples that are not discrete. In one embodiment, after the variation of the duration of one or more interference samples, a received signal quality measure is made and the received pulse train signal is modified. This process is repeated until the best possible received signal quality that can be achieved is determined. Alternatively, interference sample time durations can be varied until the received signal quality satisfies a signal quality criterion.

The receiver can systematically satisfy the quality criterion using a multitude of 'modify and compare' approaches. The sample time, sample time duration, or the number of interference samples can be modified in sequential order, random order, or in another order defined by some ordering rule (e.g., reverse order, round-robin order, alternating order, etc.). Alternatively, a combination of sample time durations, sample time positions and/or the number of interference sample times can be modified using a predefined order. Thus, a given modification may involve shifting an interference sample time, changing the number of the interference samples, and/or changing the duration of an interference sample. Alternatively, multiple interference samples may be modified simultaneously. Modifications to interference samples can also be determined by interpolation or extrapolation based on a number of received signal quality measures.

One embodiment involves shifting the interference sample times forward or backward in time incrementally using an established time step value in a systematic 'getting warmer—getting colder' manner. For example, with this approach, the direction of the time shift and the magnitude of the time step can be changed based on the improvement or degradation of the measured signal quality. Alternatively, interference sample times can be randomly shifted to different positions in time or shifted in a manner defined by a variety of common numerical optimization search methods such as a Newton-Raphson method, steepest descent method, secant method, conjugate gradients method, first derivative test method, or second derivative test method. Generally, one skilled in the art will recognize that a multitude of different numerical methods commonly used for finding roots or solving minimization/maximization problems may be applied to locate optimal interference sample times, sample time durations, and numbers of interference samples.

IV. Coded Communication

In accordance with another aspect of the present invention, the impulse transmitter transmits a pulse train for conveying an information signal in accordance with code elements of a time hopping code, which can be produced using a code generation technique as described previously. The code elements of the first code specify the arrival times of the pulses at the impulse receiver, which receives the pulse train signal in accordance with the code elements of the first code. The receiver also measures interference samples at times specified by code elements of a second code, which can be produced either using a code generation technique or by selecting interference sample times relative to the pulse positions specified by the first code. In either case, the interference sample times specified by code elements of the second code are not allowed to coincide with a pulse time position specified by a code element of the first code. Under this arrangement, the code elements of the second code are varied until the received signal quality measures satisfy the predefined signal quality criterion.

According to another aspect of the present invention, the receiver and transmitter use codes having a different number of elements to communicate with each other. Under this arrangement, a pulse train signal is transmitted with pulses positioned in time in accordance with code elements of a first code produced using a code generation technique as described previously. The pulse train signal is received in accordance with code elements of a second code. The code elements of the second code may comprise the code elements of the first code and additional code elements. The additional code elements can specify various parameters. Under one exemplary embodiment, the interference samples are measured at times specified by the additional code elements of the second code. The second code can be produced by combining the code elements of the first code with additional code elements determined relative to the code elements of the first code such that interference sample times do not coincide with pulse arrival times.

Figure 12:
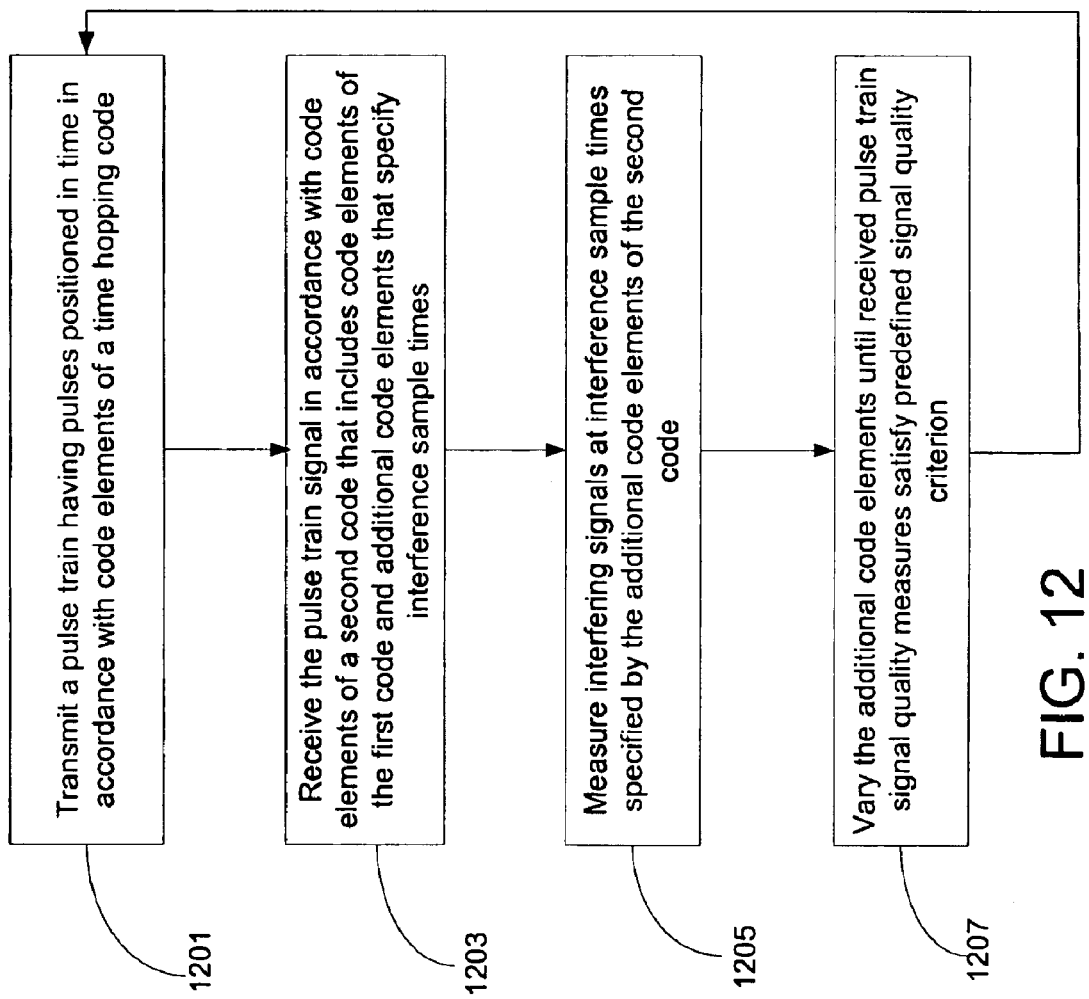
FIG. 12 shows a flow chart of a communication method in accordance with the present invention.

FIG. 12 shows a flow chart for coded communication of a pulse train between the impulse transmitter of FIG. 8 and the impulse receiver of FIG. 9. The pulse train signal comprises pulses having predefined pulse characteristics that are defined in accordance with a layout. The pulses are positioned in time according to predefined pulse characteristics that correspond to arrival times of the pulses at the impulse receiver. In accordance with one aspect of the present invention, the impulse transmitter transmits a pulse train for conveying an information signal in accordance with code elements of a time hopping code, block 1201. The code elements of the code specify the arrival times of the pulses at the impulse receiver, which receives the pulse train signal in accordance with code elements of a second code that includes code elements of the first code and additional code elements that specify interference sample times, block 1205. The interference sample times can be specified by additional code elements at the receiver. In this way, the receiver measures interference samples at times specified by the additional code elements, block 1205.

As stated above, the present invention improves received signal quality by varying the interference sample times until the predefined received signal quality criterion is satisfied. In the coded communication environment, the received signal quality can be measured. Under this embodiment of the present invention, the additional code elements of the second code are varied until the received signal quality measures satisfy the predefined signal quality criterion, block 1207.

In an alternative embodiment of the present invention, the second code may comprise a subset of the code elements of the first code. Under one exemplary embodiment, the receiver receives in accordance with the second code a subset of the pulses transmitted in accordance with the first code.

What is claimed:

1. A method for communicating pulses positioned in time in accordance with a time layout, comprising:
    transmitting a pulse train signal comprising at least one pulse having at least one predefined pulse characteristic, wherein a predefined pulse characteristic corresponds to an arrival time of the at least one pulse at a receiver;
    recovering a received pulse train signal in accordance with the arrival time of the at least one pulse;
    measuring one or more interference samples at one or more interference sample times that do not coincide with an arrival time;
    modifying the received pulse train signal in accordance with a measured interference sample; and
    varying at least one of said one or more interference sample times until one or more received signal quality measures satisfy a predefined signal quality criterion.

2. The method of claim 1, wherein one or more arrival times are relative to one or more interference sample times.

3. The method of claim 1, wherein modifying the received pulse train signal includes removing interference in accordance with an interference sample.

4. The method of claim 1, wherein the received pulse train signal is recovered by correlating a template signal at an arrival time of a pulse.

5. The method of claim 1, wherein the received pulse train signal is recovered by correlating a template signal with a plurality of arrival times of a plurality of pulses to produce an information signal.

6. The method of claim 1, wherein a received signal quality measure corresponds to at least one of a:
    signal strength value,
    bit-error-rate, and
    signal-to-noise ratio.

7. The method of claim 1, wherein a received signal quality measure pertains to at least one of:
    the received pulse train signal; and
    the received pulse train signal combined with at least one interference sample.

8. The method of claim 7, wherein the received signal quality measure is determined for at least one of:
    an individual pulse of the received pulse train signal,
    a plurality of pulses of the received pulse train signal,
    a subset of a plurality of pulses of the received pulse train signal, and
    all of the pulses of the received pulse train signal.

9. The method of claim 1, wherein the received signal quality measure is determined periodically.

10. The method of claim 1, wherein an interference sample time is a discrete time position.

11. The method of claim 1, wherein an interference sample time is a sample time duration.

12. The method of claim 11, wherein a sample time duration is modified until the predefined signal quality criterion is satisfied.

13. The method of claim 12, wherein an interference sample is measured by correlating a template signal over each sample time duration.

14. The method of claim 13, wherein the shape of the template signal is varied.

15. The method of claim 1, wherein the received pulse train signal is modified in accordance with at least one of a weighting factor and a weighting factor curve.

16. The method of claim 1, wherein varying an interference sample time comprises shifting the interference sample time.

17. The method of claim 16, wherein the interference sample time is shifted randomly.

18. The method of claim 16, wherein the interference sample time is shifted in accordance with an interference sample time shift increment.

19. The method of claim 18, wherein the interference sample time shift increment is a variable increment.

20. The method of claim 19, wherein the interference sample time shift increment is increased.

21. The method of claim 19, wherein the interference sample time shift increment is decreased.

22. The method of claim 16, wherein the interference sample time is shifted using at least one of a:

Newton-Raphson method, steepest descent method, secant method, conjugate gradients method, first derivative test method, and second derivative test method.

23. The method of claim 16, wherein the interference sample time is shifted to a time determined by interpolation based on a number of received signal quality measures.

24. The method of claim 16, wherein the interference sample time is shifted to a time determined by extrapolation based on a number of received signal quality measures.

25. The method of claim 1, further comprising:

varying the number of interference samples.

26. The method of claim 25, wherein the number of interference samples is varied randomly.

27. The method of claim 1, wherein a predefined pulse characteristic comprises at least one of: pulse amplitude, pulse width, pulse polarity; and pulse type.

28. The method of claim 1, wherein the arrival time of the at least one pulse is specified by a code element of a code.

29. The method of claim 1, wherein the interference sample time is specified by a code element of a code.

30. The method of claim 1, wherein the arrival time of the at least o one pulse and the interference sample time are specified by code elements of a code.

31. A method for communicating pulses positioned in time in accordance with a time layout, comprising:

transmitting a pulse train signal having pulses positioned in time in accordance with code elements of a first code;

receiving the pulse train signal in accordance with code elements of a second code, wherein the code elements of the second code comprise the code elements of the first code and additional code elements.

32. The method of claim 31, further comprising:

measuring interference samples at times specified by the additional code elements of the second code to remove interference from the received pulse train signal.

33. The method of claim 31, wherein a code element of the first code corresponds to an arrival time and an additional code element corresponds to an interference sample time.

34. The method of claim 31, further comprising:

determining a received signal quality measure for the received pulse train signal; and varying the additional code elements of the second code until a predefined quality criterion is satisfied.

35. A method of coding interference sample times, comprising the steps of:

producing a first code having a plurality of code elements that specify a position in time of a plurality of pulses in accordance with a layout; and producing a second code having at least one additional code element from said first code wherein the at least one additional code element specifies an interference sample time in accordance with the layout.

36. A method for communicating pulses positioned in time in accordance with a time layout, comprising:

transmitting a pulse train signal having pulses positioned in time in accordance with code elements of a first code;

receiving a subset of the pulse train signal in accordance with code elements of a second code, wherein the code elements of the second code comprise a subset of the code elements of the first code.

37. A method for communicating pulses positioned in time in accordance with a time layout, comprising:

transmitting a pulse train signal having pulses positioned in time in accordance with code elements of a first code;

receiving the pulse train signal in accordance with code elements of the first code;

measuring interference samples at times specified by code elements of a second code to remove interference from the received pulse train signal.

* * * * *